March 8, 1960 H. SUTTER 2,928,074
METHOD AND APPARATUS FOR READING HANDWRITTEN
SYMBOLS, PARTICULARLY NUMERALS
Filed Sept. 27, 1955 16 Sheets-Sheet 1
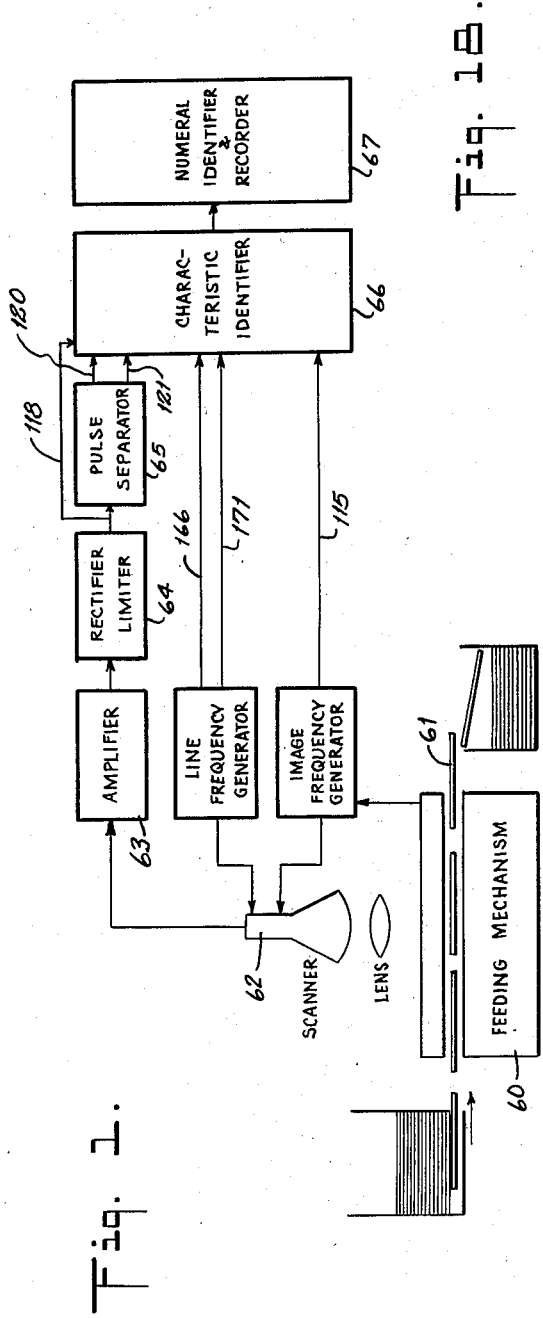
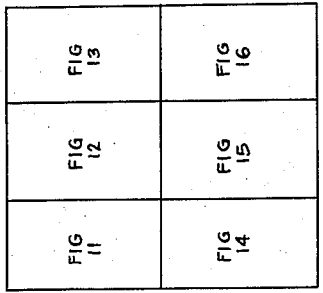
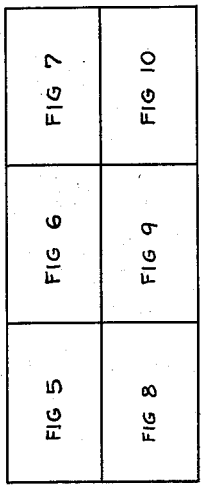
INVENTOR.
HANS SUTTER
BY
ATTORNEY INVENTOR
HANS SUTTER
BY Darby & Darby
ATTORNEYS March 8, 1960  H. SUTTER  2,928,074
METHOD AND APPARATUS FOR READING HANDWRITTEN
SYMBOLS, PARTICULARLY NUMERALS
Filed Sept. 27, 1955  16 Sheets-Sheet 11

INVENTOR
HANS SUTTER
BY
ATTORNEYS

March 8, 1960 H. SUTTER 2,928,074
METHOD AND APPARATUS FOR READING HANDWRITTEN
SYMBOLS, PARTICULARLY NUMERALS
Filed Sept. 27, 1955 16 Sheets-Sheet 14

INVENTOR
HANS SUTTER
BY
ATTORNEYS

United States Patent Office 2,928,074
Patented Mar. 8, 1960

2,928,074

METHOD AND APPARATUS FOR READING HANDWRITTEN SYMBOLS, PARTICULARLY NUMERALS

Hans Sutter, Lima, Peru

Application September 27, 1955, Serial No. 537,001

23 Claims. (Cl. 340—149)

The present invention relates to a method and apparatus for reading handwritten symbols, particularly numerals, and for utilizing the reading to record the digits of a number thus making it possible to utilize directly of a original numerical data and to operate upon such data in any desired mathematical manner.

More particularly still the invention relates to methods and apparatus which make it possible to identify and recognize numerals on the basis of certain characteristic forms without the necessity of the numerals being perfectly formed or exactly located.

Devices for determining the value of numerals are known. These devices consist of two general types, the first of which depends upon the place on the card or other material in which the symbol is entered. In this type of device the form of the symbol is not important and, in fact, a dash or check mark serves as well as does the numeral itself.

The second general type depends upon the form of the symbol for its identification, but in this case the symbols must be perfectly formed and must be placed accurately on the writing line. Each of these types of device has certain disadvantages. The first type mentioned requires the writer to locate the position on the card which corresponds to the digital value and does not permit of continuously writing along a given writing line. In the second general type the disadvantage mentioned is not present, but the writer is compelled to maintain the exact form of the numeral, to place it on a particular line, and to form it to an exact size.

In both cases the writer must adapt his formation or location of the symbols or numerals to the requirements of the reading or identifying machine. In contrast, the present invention provides a machine which will identify numerals despite major variations in the formation thereof; which does not depend upon the particular location of the symbol, and in which the symbol need have no predetermined size or be placed exactly along the writing line. Additionally, neither the thickness of the stroke nor the material with which the writing is done is important. Further, the sensing and identification of the numerals is rapid and can be performed in times no greater than is necessary for sensing and identification through the means of the human eye and brain. For example, a numeral may be sensed and recorded in a time of not more than one fiftieth of a second.

The present invention utilizes a scanning method for producing electrical impulses which serve to identify the symbol or numeral. Neither the shape or amplitude of the produced pulses is important since the identification is effected in accordance with the phase of these pulses and the number of pulses per scanning line.

In practice, an image iconoscope or flying spot cathode ray tube is utilized to transform the symbols into a time sequence of electronic impulses. This is accomplished by optically projecting the numerals onto the iconoscope mosaic, the usual deflection means being provided to cause uniform linear scanning.

The documents to be scanned may be in any form, it being necessary only that the various digits of a number to be read be placed within generally rectangular areas on the document and that arrangements be made to feed the document in steps equivalent to the width of a numeral bearing rectangle.

A simple method of providing for such a feed is to utilize tabulating machine cards as documents of original entry and to provide a feeding means which advances these cards in the direction of their length after each complete sensing operation, that is, after each complete frame scanning. With such an arrangement the cards may be fed at a speed of one hundred per minute and if the card area is divided longitudinally into twenty-seven spaces and there are three spaces between cards, then approximately fifty numerals per second will be projected onto the image screen of the iconoscope. If each image is composed of fifty scanning lines there will be a line frequency of 2500 per second. Assuming that twenty pulses might be produced in each scanning line this would result in a pulse frequency of 50,000 per second. It is thus clear that the device is a practical one since the speed of card feed as well as the pulse frequency is well within those presently commercially used.

The cards may be fed intermittently as indicated above or if desired the cards may feed with a continuous movement beneath the scanning device, this being accomplished by modifying the horizontal deflection circuits of the iconoscope or similar scanner so that each line is slightly displaced with respect to the preceding line in the direction of travel of the card. In this manner each individual numeral may be properly scanned as it progresses through the feeding means without the necessity of stopping the card during the scanning operation.

The method of identifying the various numerals and distinguishing them one from another even though they are poorly formed, of uneven size, or located at the edge of the area in which they are to be placed, is based upon establishing certain criteria and determining whether the particular numeral possesses or does not possess each of these criteria. These criteria or characteristics are such that the largest possible number of symbols can be identified thus making it possible to identify a numeral even though it is so poorly written as to but faintly resemble the standard form thereof. Moreover, the characteristics chosen utilize only completely determinable properties of produced pulses such as the phase thereof—i.e., the relationship of the pulse position to the edge of the scanning line or the edge of the area included in the iconoscope raster—and the number of pulses per line.

Amongst the characteristics which have been chosen to illustrate a preferred embodiment of the invention are the following: the direction in which certain strokes of the numeral are inclined and whether or not there is a change in the direction of the stroke by which the numeral is formed. These are only two of a number of characteristics which are determined—they are, however, mentioned here because these determinations are essential to the preferred embodiment of my invention and the means through which these determinations are made are novel and constitute an important part of the invention.

As will be seen from the above very general description of my invention, it is an object of the invention to provide a method and means for identifying a handwritten symbol and particularly for distinguishing handwritten Arabic numerals, one from another.

It is another object of the invention to so identify numerals without regard to their exact location on a particular document and without the necessity of forming the numerals in accordance with a standard.

It is still another object of the invention to provide means for identifying numerals which will be effective to distinguish between such numerals even though they are large or small, poorly formed, or non-uniformly located. In fact, the method and apparatus of my invention makes it possible to distinguish some 50,000 different forms of the ten Arabic numerals and to properly read and record the numerals despite such major variations.

It is a still further object of the invention to identify the various numerals by means of an iconoscope on which the numerals are projected optically, one by one, each image forming a complete scanning frame on the iconoscope, and determining by the pulses produced as the iconoscope image screen is scanned, which numeral was present as an image thereupon.

It is a further object of the invention to utilize only the phase relationship of pulses produced in the successive scanning lines together with the number of pulses produced on various of the scanning lines to identify the numeral read, thus eliminating the particular shape and amplitude of the pulses as sources of error.

It is a further object of my invention to provide means for determining the direction of a particular portion of a numeral which may be termed a stroke and to determine also when a particular stroke ends and another stroke begins, and to determine likewise when there is a change in direction of a stroke.

It is a still further object of the invention to provide means for causing a particular stroke to be followed until it ends and to then follow another portion of the numeral until it in turn ends or changes its direction.

It is a still further object of the invention to provide means for registering during each scanning frame, the determination of various characteristics of the numeral and for effecting a final recording based upon the combination of registered characteristics to thus completely identify and record the numeral read by the scanning means.

Other objects and features of the invention will be apparent when the following description is considered in connection with the annexed drawings, in which, Figure 1 is a block diagram showing the relationship of the feeding means, sensing means, signal amplifying, limiting and pulse separating means, frequency generators, characteristic identification circuits, and final numeral identification circuits;

Figure 3:
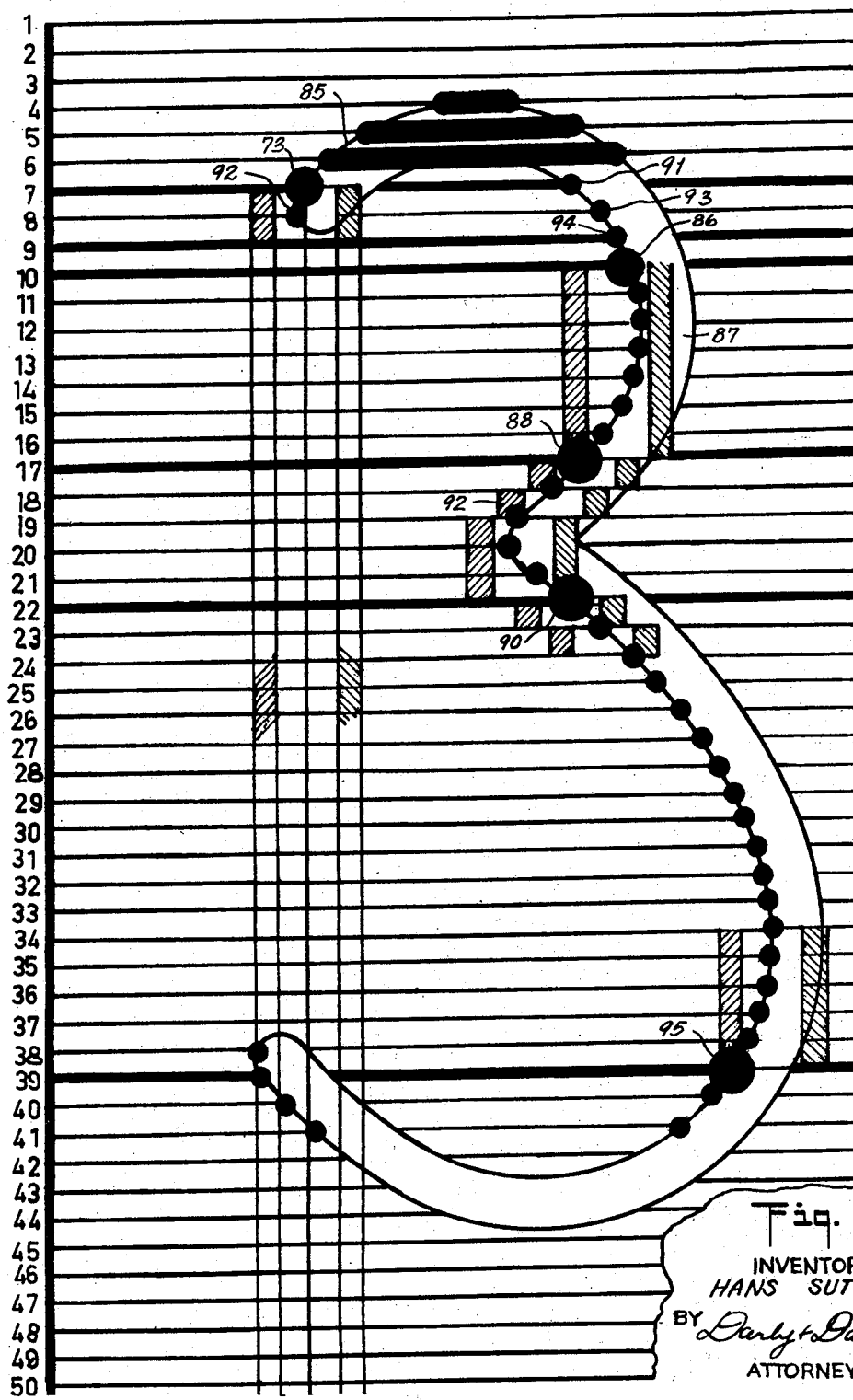
Figure 3 is a showing of an example of a numeral as projected upon the face of the iconoscope illustrating the scanning lines and emphasizing those lines which are effective in identifying this particular symbol. It is understood that the numeral three is merely exemplary of the manner in which the device identifies and distinguishes the symbols from each other.
Figure 4:
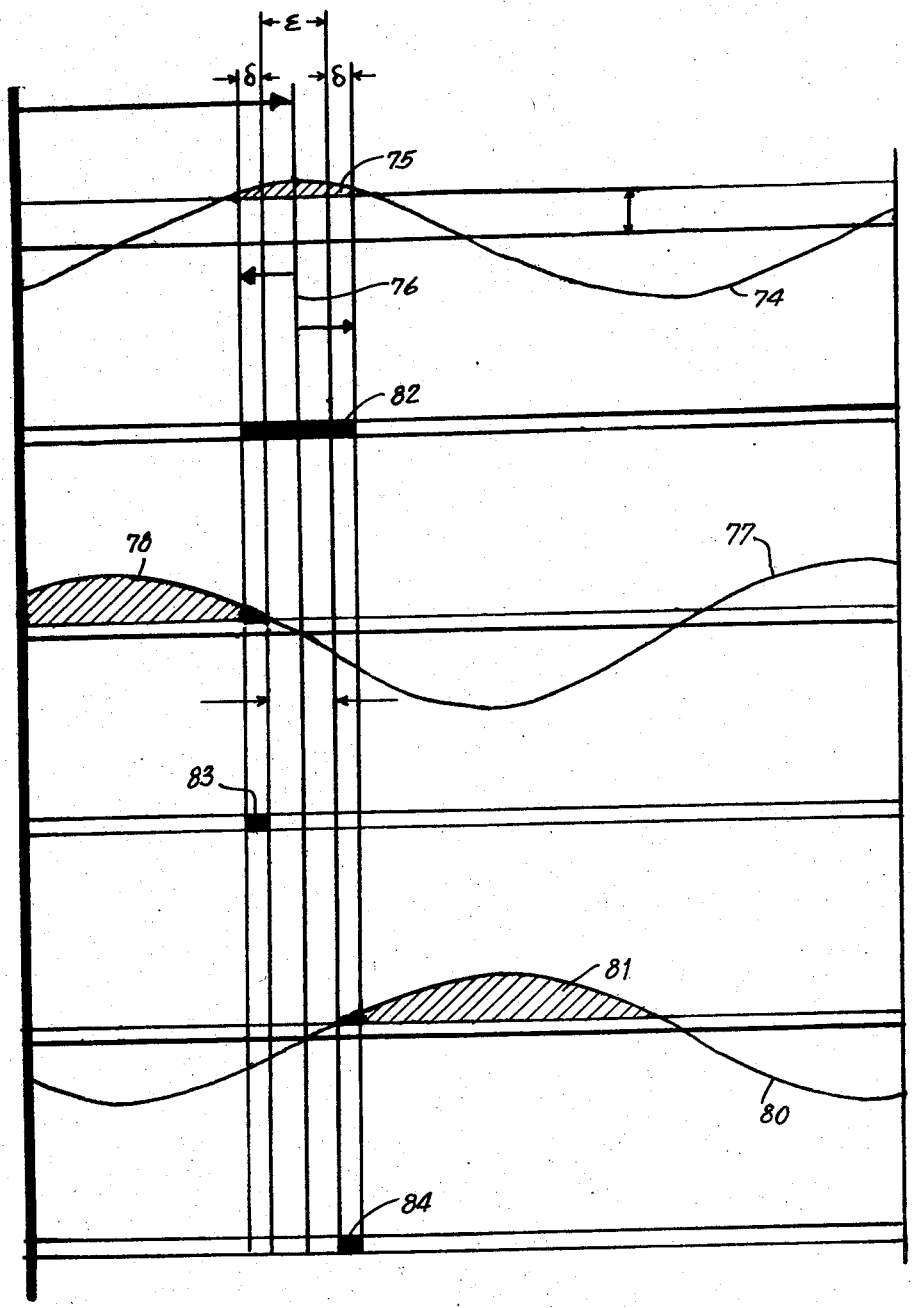
Figure 11:
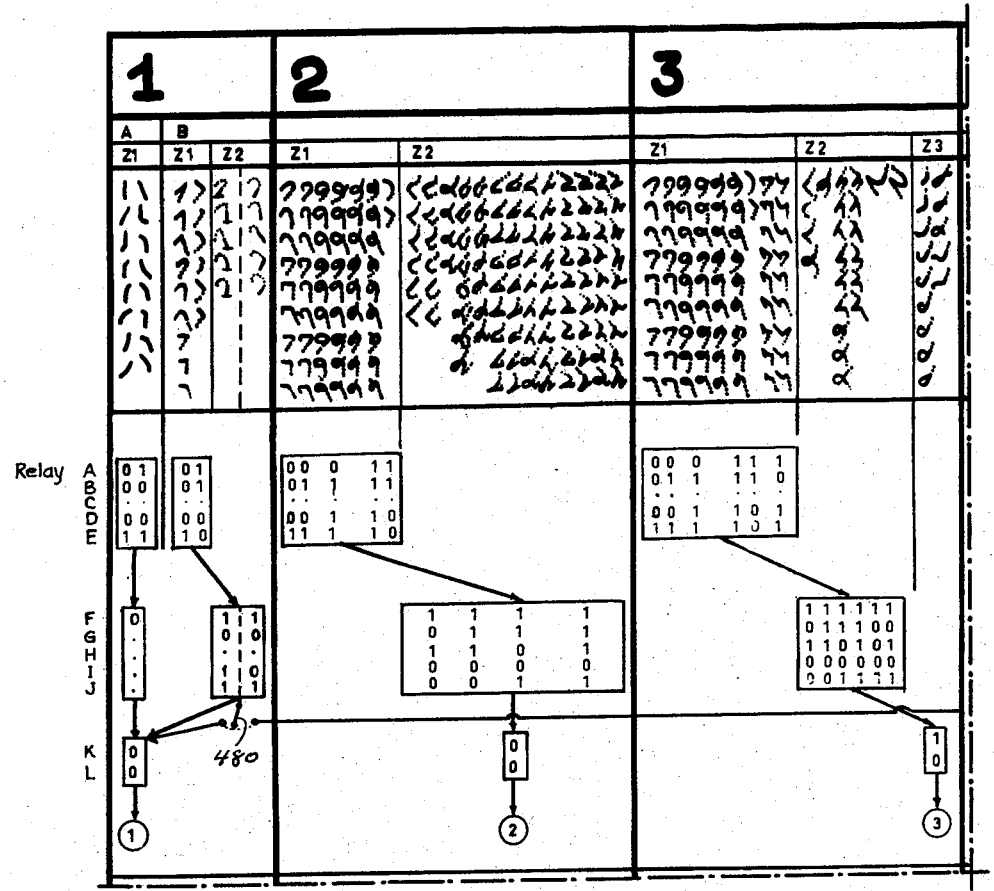
Figure 12:
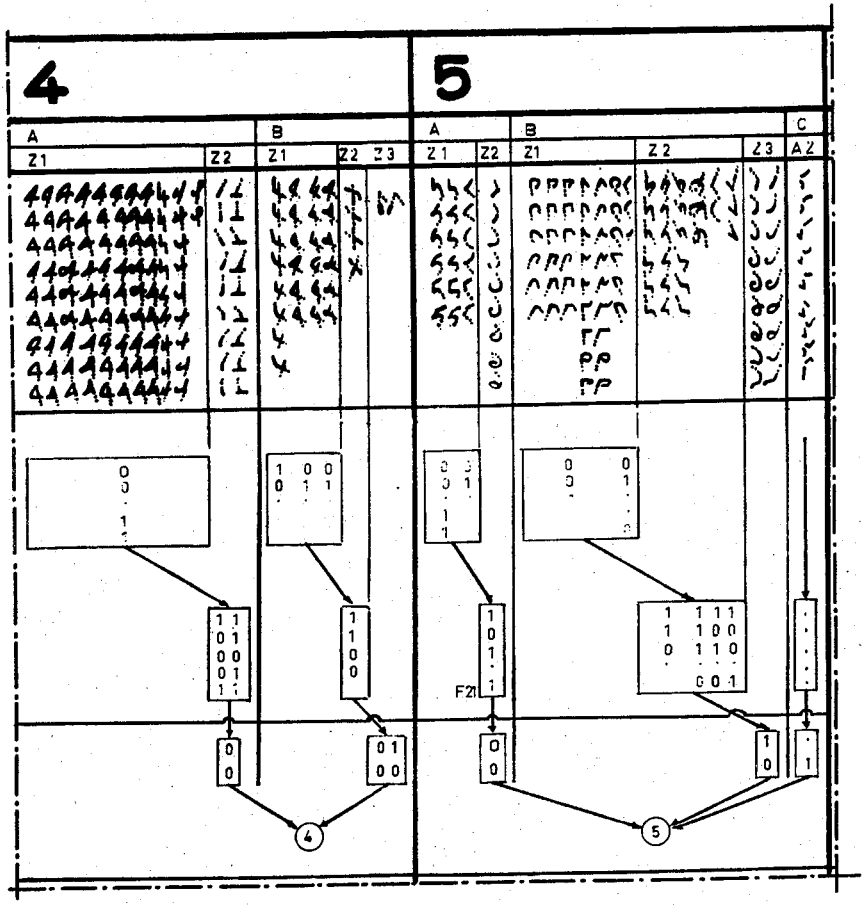
Figure 13:
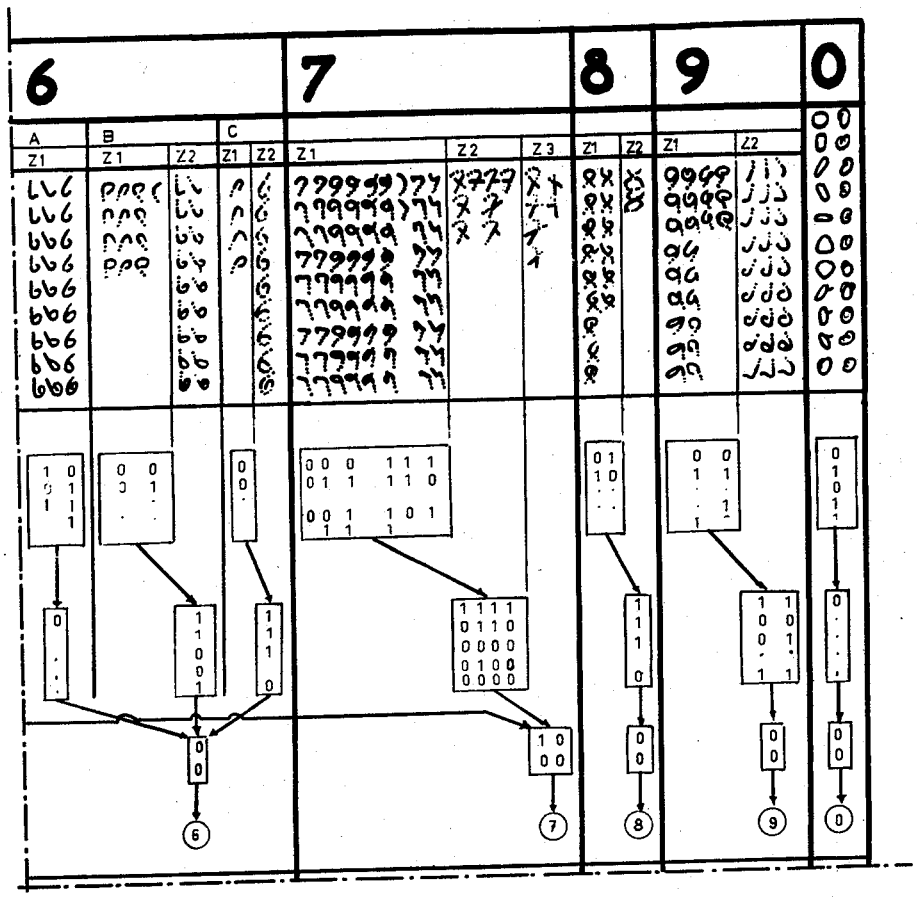
Figure 14:
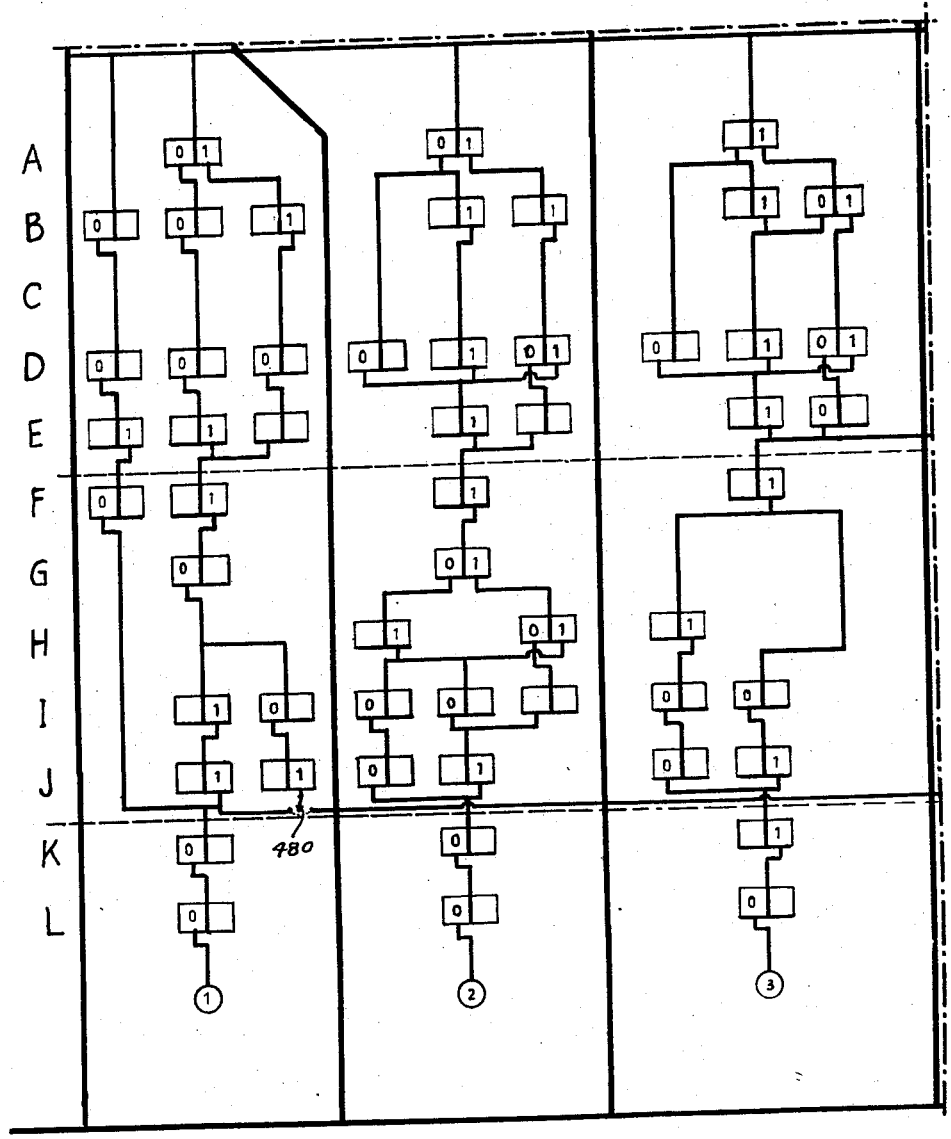
Figure 15:
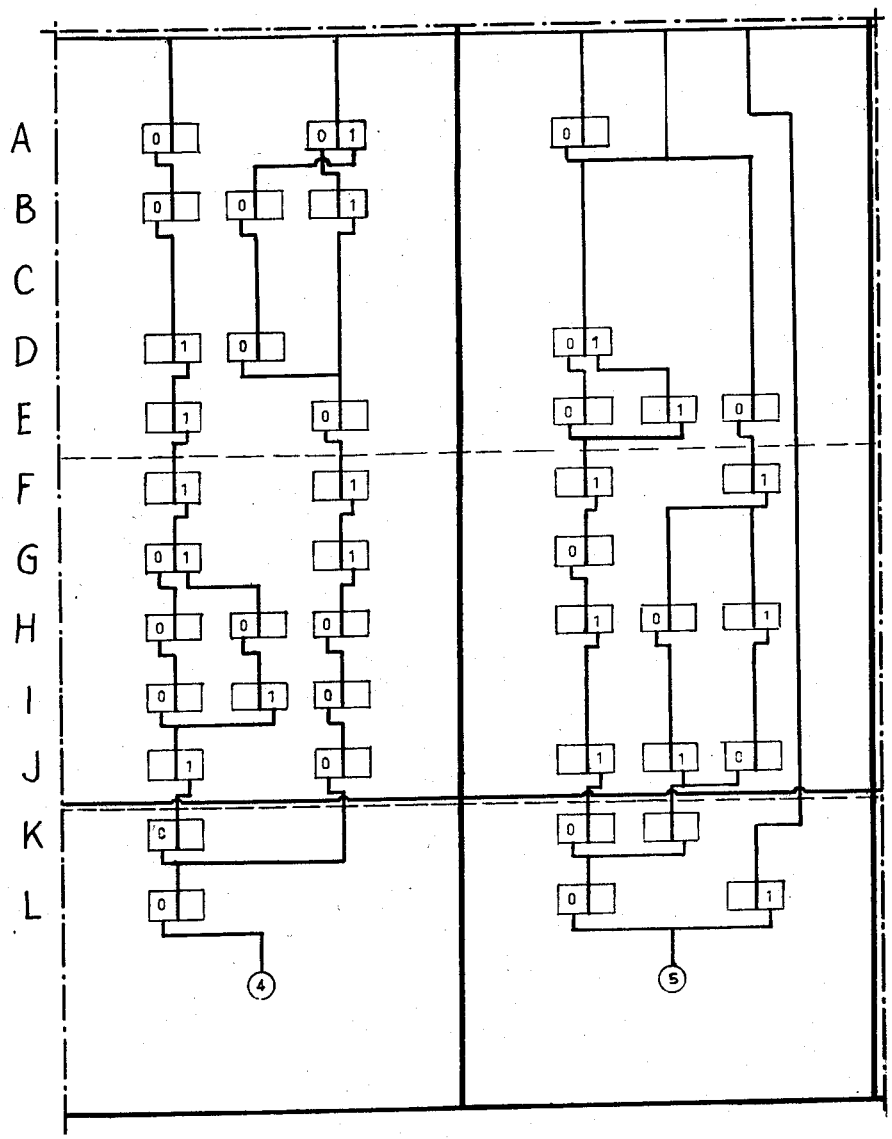
Figure 16:
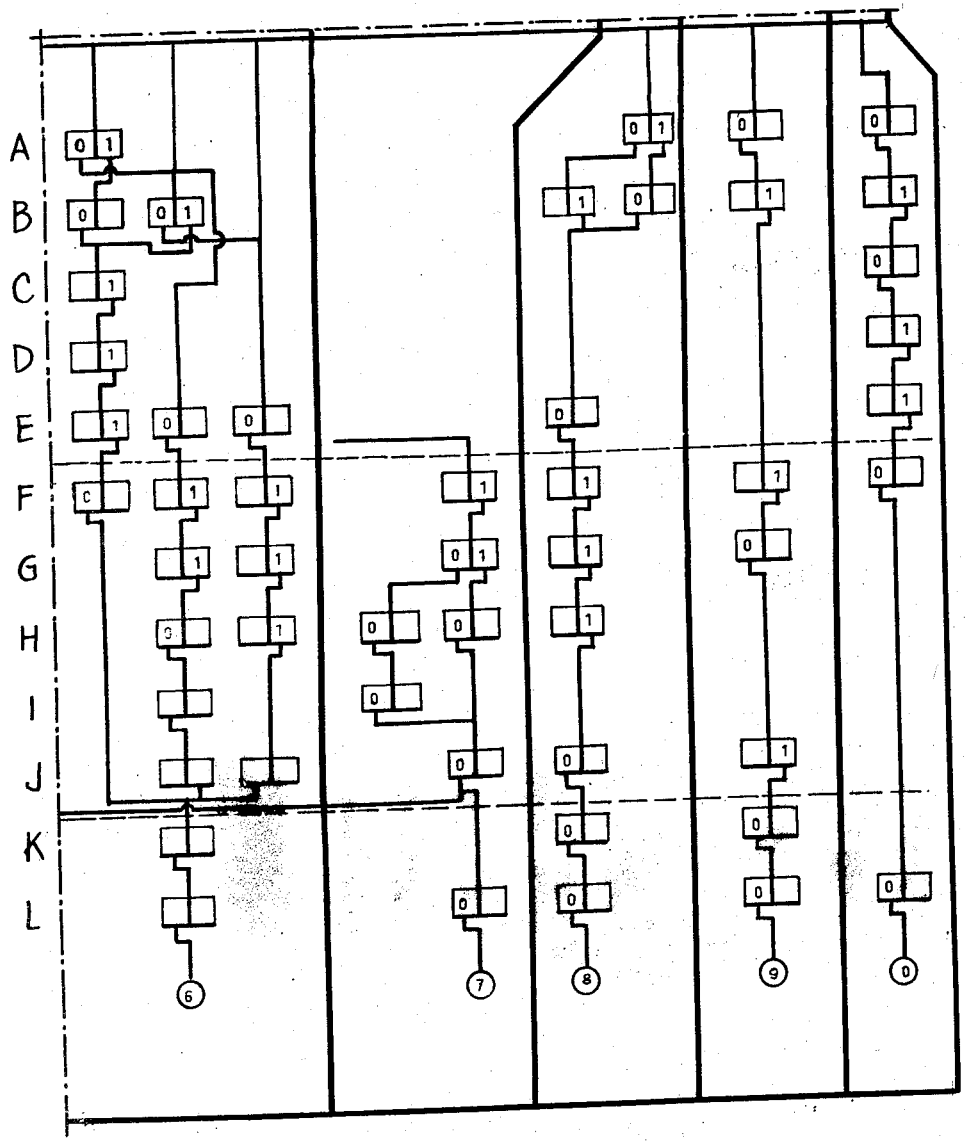

Figure 4, taken together with Figure 3, is a schematic showing of the phase relationship of certain pulses which are utilized in determining the direction in which a particular stroke proceeds;

Figures 5, 6, 7, 8, 9 and 10 together constitute a schematic wiring diagram of the identifying circuits of the instant invention;

Figure 11 illustrates the numerous modes in which the numerals one, two and three may be formed and the manner in which the determination of the various characteristics result in indications that the numerals are the particular ones read;

Figure 12 illustrates the modes in which the numerals four and five may be formed, together with the determination of characteristics which results in the final indication of the particular numeral;

Figure 13 shows various manners in which the numerals six, seven, eight, nine and zero may be formed together with a schematic diagram illustrating the manner in which combinations of characteristics as determined, finally identify the particular numeral;

Figure 14 is a schematic diagram which illustrates the operations of certain relays which, by permutation circuit connection of their contacts, resolve the determination of the various characteristics into a single resulting operation of a final relay or like device which indicates the particular numeral of the group 1, 2, 3 which has been read;

Figure 15 is similar to Figure 14 but shows the relay circuitry involved for the numerals four and five;

Figure 16 illustrates the relay connections involved for indicating the numerals from six through zero;

Figure 17 is a diagrammatic showing of the mode of assembling Figures 5 through 10 in order to form the complete schematic wiring diagram;

Figure 18 is a diagrammatic showing of the assembly of Figures 11–16.

As has been indicated, the device is intended for reading numerals and particularly Arabic numerals. As will be obvious, the device is particularly adapted to reading numerical data from documents of original entry, such for example as ledger sheets.

However, for the purposes of simplifying the discussion it is assumed that the numerals are written on a longitudinal line on a card of the general size and shape of a standard tabulating machine card, the card being divided longitudinally into twenty-seven spaces so that twenty-seven digital positions may be considered. The reason for so assuming is that mechanisms are available for feeding such tabulating machine cards through sensing mechanisms and minor modifications of such feeding mechanisms may be utilized to feed the card step by step into position such that the successive denominational digital orders will be projected onto the face of an iconoscope.

In practice, it is quite possible that documents of original entry such as ledger sheets, invoices, sales tabulations, etc. would be made up on standard size sheets of relatively stiff paper so that by feeding in one direction the successive digits of a number appearing on a single line would be read, the sheet then being "line spaced" and carriage returned and the successive digits of the next following number read in order. As will be clear, by proceeding in this manner the numbers could be successively recorded in an accumulator, register or other device and have any of the common computational operations performed thereupon. For example, the various numbers could be entered into an accumulator and simultaneously printed and a total could be taken in the usual manner. Also, it is entirely practical to utilize the handwritten cards discussed above for the production of punched cards which can then be sorted and tabulated in well known manner.

*Basic mechanism*

Referring now to Figure 1, there is shown therein in block diagram form the various elements of the circuit and mechanism which together comprise the machine of the instant invention.

At 60 is shown a feeding mechanism through which cards such as those indicated at 61 are fed. Mounted in position to have the numerals written on the cards optically projected on its face is an iconoscope or similar scanning device 62. The output from the scanner is fed to an amplifier 63 which in turn feeds into a limiter 64. The amplified and limited signals from limiter 64 are then fed to a pulse separator 65, the outputs of which are in turn fed to a circuit 66 (which will be described in detail hereinafter) and which circuit serves to indicate which of the said identifying characteristics are present in a particular character or numeral which has been scanned.

The output of circuit 66 is thereafter fed to a final numeral identification circuit 67, the output of which may in turn be utilized to operate visual signalling devices or may be fed to an accumulator, register, totalizer, card punch or other similar device.

Figure 2:
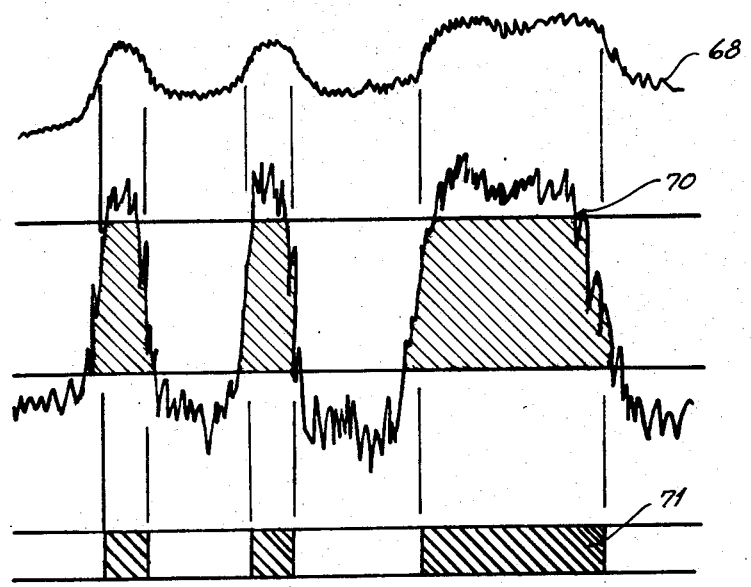
Figure 2 shows a fragmentary portion of a signal produced in the output of the scanning device such as an iconscope or flying spot scanner together with the resultant signal after amplification and clipping and as utilized in the input to the identification circuits of the reading device.

Referring now to Figure 2, there is shown at the top thereof a curve 68 which curve is a typical output curve from the iconoscope 62. At 70 of Figure 2 is shown the amplified and limited signal produced by passing signal 68 through the amplifier 63 which also serves to somewhat limit the signal. At 71 is shown the further limiting of the signal as performed in limiter 64 to produce the final wave form of the signals as applied to the pulse separator 65 and, after separation, to characteristic identification circuit 66.

The operation of the characteristic identification and the numeral identification circuits is described in detail hereinafter and is shown particularly in Figures 5 through 16.

*General description of characteristic identification means*

In order to identify the various Arabic numerals, one from the other, the characteristics of the numerals must be determined. Although many characteristics might be utilized the present embodiment of the invention is a preferred one since the determining characteristics are of such a nature as to require the utilization of only determinable properties of the impulses forming the final output of the iconoscope circuit as discussed in connection with Figure 2, that is, the phase and number of impulses per scanning line. The particular features or characteristics which are considered and which determine the identification of the number will shortly be listed. However, prior to this listing it should be stated that the various numerals are divided into different zones thus resulting in utilization of certain of the characteristics repeatedly in identifying the numerals. The number of such zones utilized in identifying the numerals varies and occurs automatically as the reading or sensing progresses as will subsequently appear. The characteristics or features which are utilized in this embodiment are the following:

A. The initial stroke of the symbol or numeral is inclined downwardly toward the right.

B. Within the first zone there is a directional change in the slope of the line forming the numeral.

C. In the uppermost portion of the numeral the stroke followed is alone.

D. Within the first zone there is a scanning line on which at least three pulses occur.

E. The first zone terminates because the stroke being followed terminates.

F. There is a second zone.

G. Within the second zone there is a scanning line on which a second pulse occurs, this pulse being later in time than the first pulse or, in other words, there is a stroke to the right of the stroke being followed.

H. Within the second zone there is a change in direction of the stroke being followed.

I. Within the second zone there is a scanning line on which the stroke being followed is intersected by a horizontal line.

J. The second zone terminates because the stroke being followed terminates.

K. In the third zone, provided there is a third zone, the stroke being followed inclines downwardly to the left.

L. There is an interruption in the stroke forming the numeral.

It will be understood that each of the statements A through L above, is true or false and that the determination of the truth or falsity of each of these statements results in a complete identification of the particular numeral.

As stated hereinabove, the numerals are divided into varying numbers of zones, the division taking place automatically and in accordance with the general conformation of the particular numeral considered. Thus one zone may be defined as zone Z0 and is that period of time during which the cathode ray of the iconoscope scans without striking a portion of the mosaic on which an image of the numeral is cast. If the first impulse produced in the circuit results in a long pulse, that is, if the numeral has a horizontal line or an arch at the uppermost portion, then zone Z0 is prolonged and this zone terminates only when the scanning beam crosses over a non-horizontal portion of the numeral and produces a short pulse.

As will appear hereinafter, when such a short pulse results the circuit is energized or gated, and the following zone Z1 is deemed to have started.

In this zone the stroke which produced the first short pulse is followed and determination is made whether this stroke inclines downward to the right or does not. This zone Z1 ends when, (a) the stroke which is being followed terminates; or
(b) the stroke which is being followed has at all times been alone and now changes its direction; or
(c) the stroke being followed was not alone but now is alone.

Zone Z-2 terminates when either:

(a) the stroke being followed terminates;
(b) the stroke being followed changes its direction provided that the following additional conditions are met—
   (1) when the change in direction is one from left to right,
   (2) when change is one in direction from right to left, zone Z-2 terminates only if Z-1 did not terminate due to the termination of the stroke being followed.
(c) the stroke being followed in Z-2 was not alone but is now alone.

The determination of the various characteristics including the following of strokes, the determination of number of pulses per line, the transition from zone to zone, etc. are effective to operate various electronic circuits (in unit 66, Fig. 1) in such a manner as to result in the final operation of a group of twelve relays (unit 67, Fig. 1) in combination. Since the relay contacts are wired to effect completion of circuits in accordance with the particular relay combination operated, the final result is the operation of one of ten relays each of which is assigned to a specific one of the ten Arabic numerals.

Before proceeding to the description of the circuits illustrated in Figures 5 through 10, the mode of following selected portions or strokes of a numeral or other symbol will be described, particular reference being had to Figures 3 and 4.

In this connection it should be noted that although reference has been made above to identification of characteristics of the numerals, in reality the characteristics are identified as curves, straight lines, with respect to their slope, and in other ways, not as portions of any specific numeral, but rather as elements which may enter into the formation of any of the numerals. The determination of which elements are present and the order of their presence results in the final identification of a specific numeral.

It will, then, be understood that any particular numeral is represented not by a single combination of characteristics, but instead by many combinations of the various characteristics, but that there is no combination used which identifies more than a single numeral.

In the following description the operation of the machine will be described first with respect to the following of a stroke of a numeral, secondly, with respect to the determination of the various characteristics or features listed above, third, with respect to the transition from zone to zone, and finally with regard to the combination of determined characteristics to determine the numeral.

*General description of Figures 5–10*

Before proceeding with descriptions of the various operations and the mode in which the electron tubes operate, a brief description of the circuit and of the assumptions as to its condition at the institution of operation is in order, as is a statement of certain terminology used hereinafter.

In these figures many of the electron tubes are shown as dual tubes, the two sections of each tube forming in effect separate tubes circuitwise and there being no attempt to utilize the two sections of a single tube to perform related functions. In this circuit diagram certain well known portions have been omitted. For example, no means is shown for voltage stabilization nor for the generation of the various supply voltages. In the circuit diagram the conductor 114 is indicated in light lines and is the source of positive plate voltage. The conductor 115, likewise shown in light line, is a ground and is interrupted upon the end of each frame of the iconoscope projection, this being accomplished, for example, by means of a mechanically operated contact which is coupled to the card feed mechanism. The conductor 116 is likewise at ground potential but this conductor is permanently connected to ground and the supply thereover is not interrupted at the end of each frame as is the supply over conductor 115. Conductor 117 is at a negative potential which is fixed and which is utilized for biasing various of the electron tubes. As is customary in electron circuit diagrams, no tube filaments or their heating supply voltage are shown.

The interruption of ground over conductor 115 at the end of each picture frame serves to restore various trigger tubes to their normal position so that at the beginning of the scanning of a frame the same tube sections are always conductive. As shown in the schematic diagram the left hand section of each of the trigger or flip-flop tubes is assumed to be conductive at the beginning of the scanning of a frame.

In describing the operation of these circuits, the term "upvolting" is utilized, this term being defined for purposes of this discussion as raising a potential but not necessarily to a positive value. Similarly, "downvolting" means lowering a potential but not necessarily to a negative value.

Also, the left hand section of each tube other than the trigger tubes is referred to as "L" as are the anode, cathode and grids thereof while the right hand section and components thereof are referred to as "R."

*Following of a stroke*

The means for following a stroke includes a means for producing a clipped sinusoidal oscillation which means is energized when the first short pulse of a stroke occurs, the phase of the oscillation being such that the maximum amplitude of the pulse occurs in following scanning lines in phase with the instant at which the cathode beam first struck the left hand edge of the particular stroke considered as for example indicated at point 73 or 86 (Figure 3). The sinusoidal wave mentioned is shown at 74 in Figure 4 (when Figures 3 and 4 are placed in vertical alignment it will be seen that the width of the pulse designated 75 in Figure 4 is evenly distributed on either side of the line 76). Figure 4 comprises curves in which the abscissa is the time for scanning a single line. It will be seen therefore that the maximum amplitude of the pulse 75 occurs on line 76 and that as much of the pulse 75 is to the left of that line as is to the right.

At the same time that the wave 74 is generated there is generated a wave 77 which wave is sinusoidal but is produced in such a manner that only the crests of the waves are permitted to enter into a circuit which controls the stroke-following operations. Further the sinusoidal wave 77 is displaced 90° from the wave 74 and a sufficient portion of the crest is utilized so that pulse 78 and pulse 75 of the wave 74 overlap to the left of line 76 and in fact at the left edge of pulse 75.

Additionally, by means of a similar phasing means a wave 80 is developed which is displaced 90° from the wave 74 in the direction opposite to the displacement of the wave 77. This wave is likewise permitted to pass only the crest thereof forming a pulse 81 similar to the pulse 78 but displaced therefrom by 180°. As a result pulses 75 and 81 overlap to the right of the line 76 the overlap being equal to the overlap of pulses 75 and 78. It is preferable that the pulses 78 and 81 each overlap the pulse 75 by an amount equal to about one-fourth of the total duration of pulse 75. The final pulses resulting from wave 74, combination of waves 74 and 77, and combination of waves 74 and 80 are indicated at 82, 83 and 84 respectively.

In order to clarify the mode in which the displaced positive amplitude pulses 78 and 81 together with the central positive amplitude pulse 75 are utilized in following the stroke subsequent to first picking up that stroke on the iconoscope screen, the total time represented by the pulse 75 is designated as the $\epsilon$ space and has a duration $2\epsilon$. The overlapped portions of the pulses 75—78 and 75—81 are utilized in order to recognize the phase of the stroke which is being followed and are designated $\delta$. The magnitudes of $\epsilon$ and $\delta$ depend on the scanning frequency; $\epsilon$ should be of the order of twice the distance between successive scanning lines, and $\delta$ of about half that amount.

In other words, if a stroke being followed extends in such a direction as to cause a signal from the iconoscope to occur during the period of overlap of signals 75 and 78, i.e., in the left $\delta$ space, then the stroke being followed is inclined toward the left. If, on the other hand, a pulse occurs during the right $\delta$ space then the stroke is inclined toward the right. The two $\delta$ spaces are spaced from the center 76, a distance of $\epsilon-\delta$ in order that any very slight inclination of the writing stroke such as might result from a shaky handwriting or other irregularities in the formation will not register as an inclination of the stroke. Further a stroke which is vertical is treated in the same manner as one which is inclined downwardly toward the left.

It is obvious from the above that the frequency of the oscillations of the waves 74, 77 and 80 must be equal to the line frequency of the horizontal deflection of the cathode beam.

So long as the signal from the iconoscope in successive scanning lines has not changed its phase by an extent greater than $\epsilon$ there is no indication that the line slopes in either direction. As soon as the signal pulse from the iconoscope on any scanning line occurs during a $\delta$ space, this gives indication both of the fact that the stroke is inclined and additionally of the direction of such inclination.

As soon as this occurs the fundamental oscillation represented by the wave 74 together with the two lateral oscillations represented by waves 77 and 80 are shifted so that the mid-point of the new $\epsilon$ space is in phase with the signal pulse which fell in the $\delta$ space.

The oscillations continue in this phase relationship until on a subsequent scanning line the signal pulse again falls in a $\delta$ space and this indicates a continued sloping in the same direction or a change in direction depending upon whether the signal falls within the same or the other $\delta$ space. However, as will appear when the circuit is described in detail, once a direction has been determined and identified for a particular stroke this is not utilized in the circuit to effect any change so long as the stroke direction remains unchanged but is utilized only when the stroke changes its direction.

With this preliminary description of the mode of following a stroke within a single zone a detailed tracing of the operation of the circuits shown in Figures 5 through 10 in connection with the identification a stroke will be given.

The stroke to be followed is first selected by means of a trigger tube 314 (Figure 5) which operates at the start of the following of a stroke and is returned to its original condition only at the end of the following of a stroke. It is thus its function to pick out the first pulse on the first line, that is, the pulse occurring furthest to the left of a scanning line, assuming that the picture is scanned from left to right. The operation of trigger tube 314 (as described hereinafter in connection with zone changes) serves to render tube 327–L non-conductive and the tube 327–R conductive (tube 372–L is independent of control from tube 314), this resulting from the downvolting bias which is applied over conductor 128 to the grid of tube 327–R. It will be noted that due to the arrangement of the circuit so that the first short duration impulse which occurs initiates the following of the stroke, the stroke furthest to the left of a numeral will always be followed, since any pulse caused by a stroke further to the right would not cause the pulse resulting to be the first short duration pulse.

The short duration impulse also causes reversal of the trigger tube 301 (Figure 5) due to the application to the grids of that tube of the output pulse from plate 327–R, the pulse being conducted to these grids over conductor 140. The trigger tube 301 is slightly differently connected than are the other trigger tubes of the circuit. This difference consists in that the two grids are connected together by means of the capacitors 141 and 142. By means of this connection successive negative pulses reverse the trigger, i.e., render one-half conductive and the other half non-conductive. This is done in order that there may be a transition from the oscillatory circuit of the tube 302 to that of tube 315 at each phase shift. By phase shift in this connection is meant each time that a pulse on a succeeding scanning line falls into a δ space as described hereinabove. Due to the use of two oscillator tubes 302 and 315 and their circuits and the use of the trigger tube 301 to switch from one oscillatory circuit to the other, a phase change may take place abruptly and furthermore the old oscillation may die away without doing any damage.

Tubes 302 and 315 are connected as Hartley oscillators having the tuned circuits 402 and 415 respectively. The sinusoidal voltage at one end of the tank circuit 402 is applied over conductor 143 to the gating or suppressor grid of tube 303–L while the sinusoidal voltage at the opposite end of the tuning circuit 402 is applied over conductor 144 to the gating grid of tube 304–L. Correspondingly the two phases of tuning circuit 415 are connected by means of conductors 145 and 146 respectively to the gating grids of tubes 316–L and 317–L respectively.

The gating grids of tubes 303–L and 304–L are biased by the voltage drop across resistor 403 and the gating grids of tubes 316–L and 317–L are similarly biased by the voltage drop across resistor 416. Consequently none of the tubes 303–L, 304–L, 316–L, 317–L is in condition for conduction except on the positive peaks of the signals from tuned circuits 402 and 415. In the standard terminology of pulse circuits the gates represented by tubes 303–L, 304–L, 316–L and 317–L are opened by the positive peaks of voltage applied to their gating grids and only at the time that these gates are opened can pulses applied to the control grids of these tubes pass through to the anodes.

The sinusoidal voltage at one end of tuned circuit 402 is opposite in polarity or displaced 180° in phase from the voltage at the other end and similarly the sinusoidal voltage at one end of tuned circuit 415 is displaced 180° in phase from the voltage at the opposite end. It follows that tubes 303–L and 316–L are in condition for conduction during a portion of the cycle when the tubes 304–L and 317–L are not. By adjusting the bias on the gating grids of the tubes, as for example by varying the impedance of resistors 403 and 416, the tubes can be rendered conductive for a desired portion of the cycle. The bias should be set so that this desired portion is equal to $180° - 2(\epsilon - \delta)$ as given hereinabove.

The sinusoidal voltages applied to the gating grids of tubes 304–L and 317–L are also applied to the control grids of tubes 304–R and 317–R. The anodes of tubes 304–R and 317–R are connected together and to the primary of a transformer 417, Figure 6, so that whichever tube 304–R or 317–R is conductive will supply a signal to energize the transformer. The purpose of the transformer 417 is to shift the phase of the energizing signal by 90° to obtain the wave form 74 of Figure 4.

In order to determine whether a stroke is proceeding to the right or to the left the phase of the iconoscope signal on a succeeding scanning line must be compared to the phase of the original signal. The positive pulse from the clipped iconoscope signal is amplified and inverted in tube 327–L and applied over conductor 147 (Figures 8, 7 and 6) and condenser 418 (Figure 6) to the grid of tube 305–L along with the sinusoidal signal from transformer 417. Tube 305–L must be biased so as not to clip or distort the most negative portion of the combined sinusoidal and pulse signal.

Figure 5:
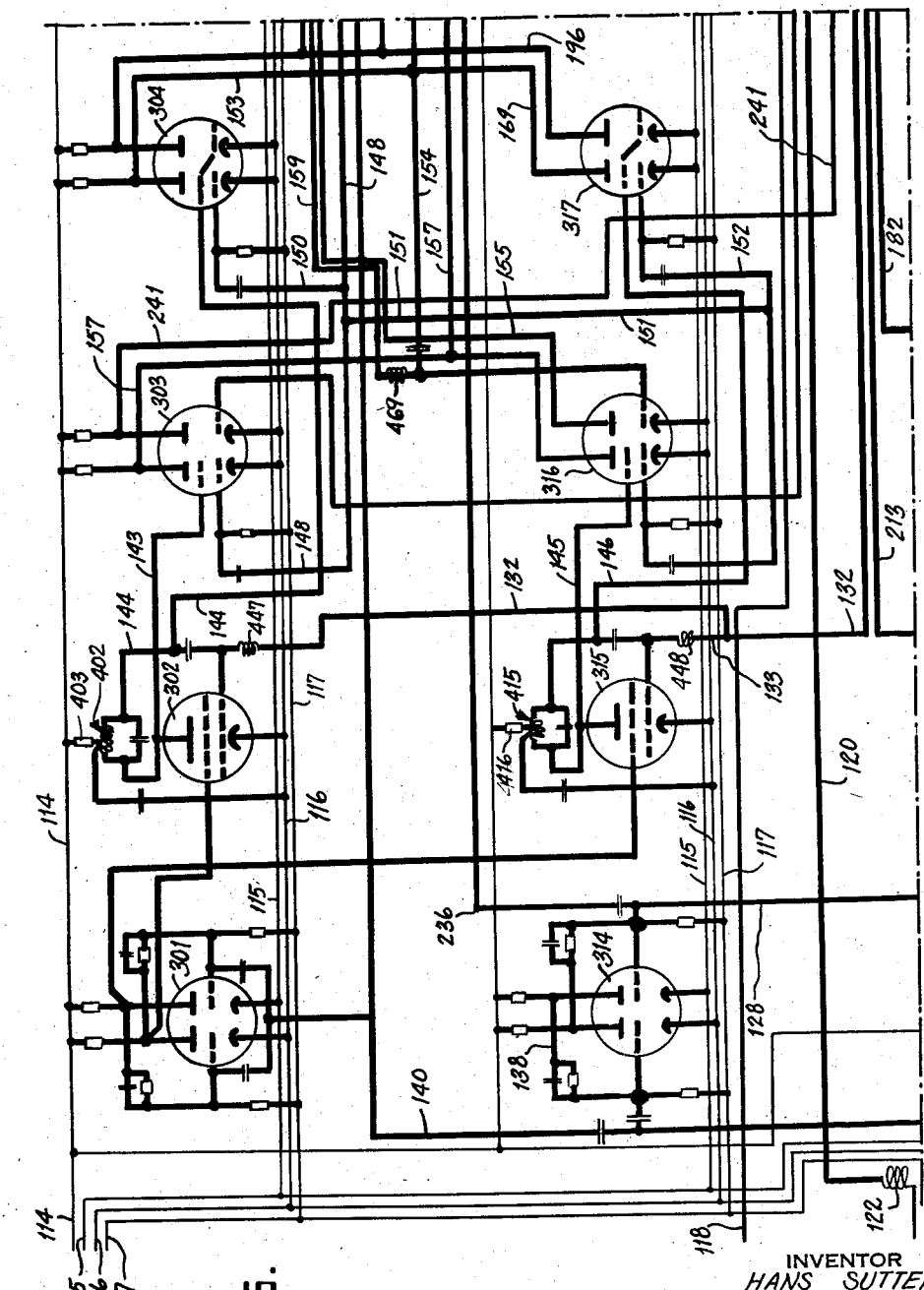
Figure 6:
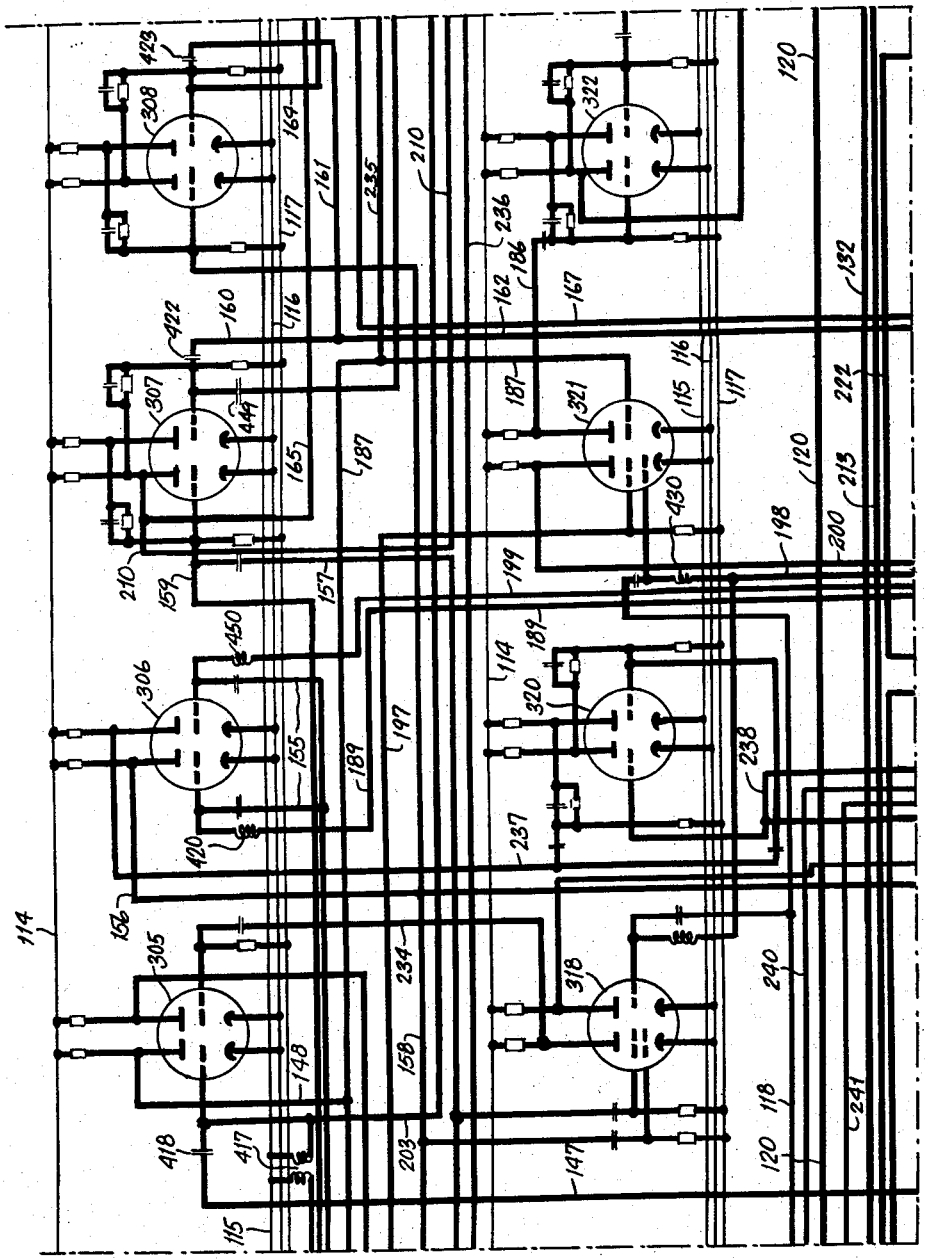

The combined signal is amplified in tube 305–L and applied from the anode thereof back to the control grids of tubes 303–L, 304–L, 316–L and 317–L by means of conductors 148, 150, 151 and 152 (Figures 6 and 5). All of the control grids just mentioned are negatively biased so that only the most positive portion of the combined sinusoidal and pulse signal from tube 305–L will pass through these tubes. This most positive portion is actually a pulse which is on a pedestal formed by the sinusoidal portion. If the pulse precedes the peak of the $\epsilon$ pulse by an amount greater than $\epsilon - \delta$ as for example at 88 (Figure 3) the pulse will pass through either tube 303–L or 316–L whichever is conducting. This is the case when the stroke is inclined downwardly to the left. If the pedestal pulse follows the peak of the $\epsilon$ pulse by an amount greater than $\epsilon - \delta$ (as for example at 90 Figure 3), the slope of the stroke being followed is to the right and in this case the pulse will occur during the time when either tube 304–L or tube 317–L is in condition for conduction.

*Mode of determining the numeral characteristics*

Before describing the means for determining whether characteristics A–L are present in a particular numeral form, a brief description of portions of the circuit effective to determine the zone is necessary.

Zone counter trigger tubes 336, 337, 338 and 340 are provided which operate at the end of each zone and alter certain connections to thus modify the operation of others of the tubes in accordance with the requirement determined by the characteristics utilized in that zone.

A preliminary zone Z–0 is provided, which serves to initiate operation of the characteristic identifying circuits upon the reception of the first short signal pulse from the iconoscope. The reception of a long pulse prior to a short pulse is without effect for reasons and in a manner described in detail when the means for effecting transition from zone to zone is described.

During zone Z–1 trigger tube 337 is reversed; during zone Z–2 tube 337 restores to its normal mode and trigger 338 is reversed and during zone Z–3 tube 340 reverses and 338 is restored to its normal mode.

*Determination of characteristic A*

The first feature considered is the feature designated as A, namely, whether the numeral begins with a stroke which is inclined downward to the right. If the initial stroke has a direction downwardly toward the right then a downvolting pulse from tube 304-L, due to a signal pulse falling in the right hand δ space, will be applied over conductors 153 and 154 to the grid of tube 316-R (Figure 5). The pulse can pass through this tube only if no direction toward the left has previously been detected (i.e., only if in truth the first direction is to the right), this being controlled by the trigger 307 (Figure 6). If a direction to the left has not been previously detected by the left direction detector trigger 307 then the left hand section of that tube produces a positive bias which is applied over conductor 159 (Figures 6 and 5) and choke coil 450 (Figure 5) to the grid of tube 316-R maintaining that tube conductive until the downvolting pulse over conductor 154 causes it to draw less current. When this occurs both grids of tube 306 are upvolted over conductor 155.

Since trigger 337 (Figure 10) has operated as a result of reception of the first short pulse, the grid of tube 306-L is negatively biased via conductors 180 (Figures 10 and 9) and 189 (Figures 9 and 6) and coil 420. Upvolting, via conductor 155 (Figure 6) of tube 306-L results in downvolting (over conductor 156 Figures 6, 9 and 8) of the left grid of trigger tube 341 (Figure 8) causing it to reverse and thereby operating relay A.

Note that when tube 337-L is conductive a high positive bias is applied to the grid of tube 306-L, so high that any positive pulse from the plate of tube 316-R is without effect. Note also that the pulse from the plate of tube 304-L cannot affect trigger 307 because of choke coil 450, and that the pulse from the plate of tube 316-R cannot affect trigger 337 because of the choke coil 420.

*Determination of characteristic B*

This characteristic is whether there is a change in direction of the stroke within the first zone. The directions observed in the tubes 304-L (or 317-L) and 303-L (or 316-L) (Figure 5) are communicated to the left hand grids of trigger tubes 307 and 308 (Figure 6), respectively. More specifically, an output pulse from tube 303-L is applied over conductor 157 (Figs. 5 and 6) to the left hand grid of tube 307 and a pulse from tube 304-L is applied over conductors 153 (Figure 5) and 158 (Figure 6) to the left hand grid of tube 308.

Figure 8:
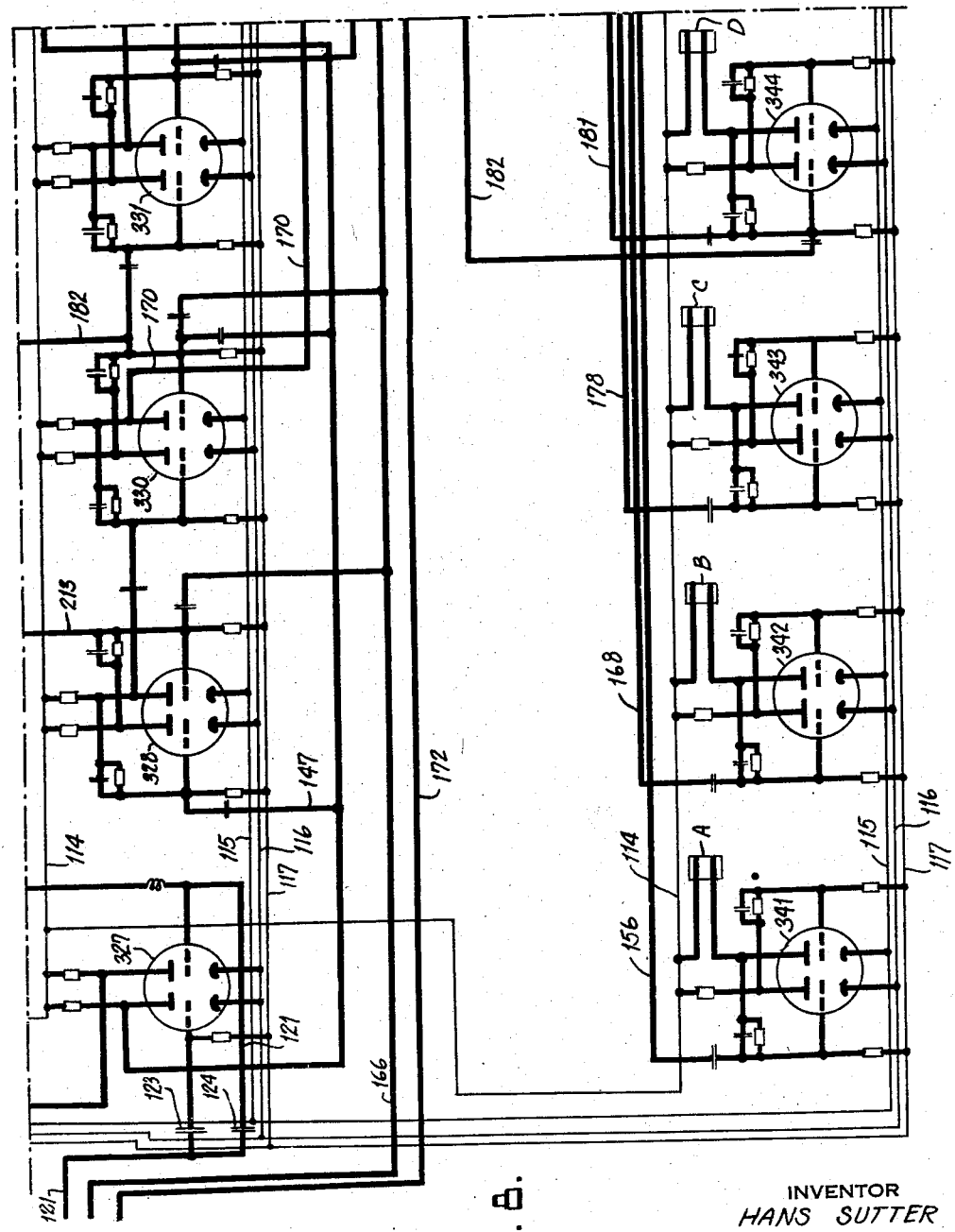

If it happens that both tubes 307 and 308 have been reversed within the same zone, this indicates that the stroke followed in that zone has proceeded in two different directions and therefore that there has been a change in direction. This must occur within a single zone to be effective since the right hand grids of tubes 307 and 308 are connected by means of condensers 422 and 423 and through conductors 160 and 161, respectively, to a conductor 162 (Figure 6) which in turn connects to conductor 163 (Fig. 8).

Conductor 163 has a pulse applied thereto when the zone ends as will hereinafter appear and therefore the triggers 307 and 308 are restored to their normal modes at the end of each zone.

When both of the triggers 307 and 308 have reversed in the same zone then both grids of tube 310-L (this tube constituting a direction change indicator) become positively biased over conductors 164 (Figures 6 and 7) and 165 (Figures 6 and 7) from grid 308-R and anode 307-L, respectively. Then, when a downvolting line-end impulse occurs on conductor 166 (this pulse being derived from the iconoscope horizontal sweep circuit) and is applied over conductors 166 (Figures 8 and 9) and conductor 167 (Figures 9, 6 and 7) to the upper grid of tube 310-L. Tube 310-L produces an upvolting pulse on the grid of 310-R which has a negative bias applied to the grid over conductor 232 (Figures 10 and 7) and coil 438 (Figure 7) from the grid of tube 337. This causes a downvolting pulse to be transmitted over conductor 168 (Figures 7, 10, 9 and 8) to the left hand grid of trigger tube 342 causing it to reverse. The resulting operation of relay B indicates a change in direction of the stroke in the first zone.

Note that tube 311-L does not operate because of the high positive bias applied to its grid from trigger tube 338 (still in its normal mode) over conductor 201 and coil 431.

*Determination of characteristic C*

Characteristic C is based upon the presence or absence in the uppermost part of zone Z-1 of a scanning line on which only one pulse occurs. This feature serves exclusively to distinguish the numeral zero from the one zone form of the numeral six.

In order to determine this characteristic a pulse counting circuit including the tubes 328, 330, 331 (Figure 8) and 332 (Figure 9) is employed. Since these counting tubes are intended to count the pulses per line, they are extinguished after each scanning line by applying a downvolting pulse on the right hand grids thereof at each line end, this pulse being supplied over the conductor 166 which has been previously mentioned and which is supplied from the horizontal deflection circuits of the iconoscope.

The counting tubes 328, 330, 331 and 332 are connected in such a manner that each pulse counted reverses the next following trigger rather than being connected in the usual manner for binary counting. Thus each of the tubes 328, 330 and 331 has the right hand anode thereof connected to the left hand grid of the next following tube.

The first signal pulse causes tube 327 to transmit a downvolting pulse over conductor 147 (Figure 8) to the left hand grid of counting trigger 328. This causes the left hand section of tube 328 to cut off and the right hand section to become conductive. The downvolting pulse produced at this moment at the plate of tube 328-R is supplied to the right hand grid of tube 330 which also reverses indicating that until this instant a single pulse was produced on that scanning line.

If a second pulse occurs on that line it will reach the right hand grid of tube 330, now upvolted, and cause 330 to reverse. The downvolting pulse then produced on the left hand plate of tube 330 is applied to the left hand grid of trigger tube 331 and also over conductor 182 to the left hand grid of trigger 334.

Trigger 334 then reverses indicating that more than one pulse occurred on the scanning line considered.

A control bias from the right hand grid of trigger 334 is supplied over conductor 171 and coil 446 to the upper grid of tube 332-R. This upper grid is also connected via condenser 442 to conductor 172 on which the upvolting line end impulses occur.

A bias is supplied to the lower grid of tube 332-R from the grid of tube 337-R (associated with Z-1) by way of conductor 177. This bias is an upvolting one when Z-1 is operated in.

Now, if only one pulse had occurred in this scanning line then trigger 334 will be in its original condition with the right hand grid downvolted. Consequently, when the upvolting line end impulse is applied over conductor 172 it will overcome this downvolting bias and render tube 332-R instantaneously conducting.

The downvolting pulse thus produced on the plate of 332-R is applied over conductor 170 to feature trigger tube 343 which then reverses, causing operation of relay C. Thus the fact that the numeral stroke being followed was alone in the uppermost portion of zone Z-1 is indicated.

*Determination of characteristic D*

This characteristic is whether in the first zone there is a line on which at least three pulses occur. In making this determination the same counting triggers which have been mentioned in connection with characteristic C are utilized.

As has been stated, the first signal pulse appearing on the scanning line will cause operation of counting triggers 328 and 330. A second pulse transmitted over conductor 147 will be applied to the right hand grid of tubes 330 and 331. This will result in the restoration of tube 330 and the application of a downvolting pulse to the left hand grid of trigger tube 331. Trigger tube 331 will then reverse, applying a downvolting pulse to the grid of tube 332–L. Since the bias on this tube has already been driven negative by the reversal of trigger 337 (Figure 10) this downvolting pulse will be without effect at this time. Receipt of a third pulse over conductor 147 will apply a downvolting pulse to the right hand grid of trigger tube 331 causing it to reverse and applying an upvolting pulse to the grid of tube 332–L. Tube 332–L, upon receipt of the third pulse, then supplies a downvolting pulse over conductor 181 (Figures 9 and 8) to the left hand grid of trigger tube 344 which reverses and causes operation of relay D to indicate that there was a scanning line in the first zone on which at least three signal impulses occurred.

Moreover, any long impulses occurring in the first zone subsequent to the first short impulse will reverse trigger 344. This results from the fact that the left hand grid of this trigger tube is connected by means of conductor 182 (Figures 8, 9, 10 and 7) to the plate of tube 312–R. Tube 312–R has been held non-conductive since receipt of the first signal pulse by virtue of a negative bias supplied thereto from the left hand plate of tube 336 over conductor 131 (Figures 10 and 7), conductors 183 and 184 (Figure 7), impedance coil 426 and conductor 185. Any long impulse is applied over conductor 120 (Figures 5, 6 and 7) differentiating capacitor 427 and conductor 185 to the grid of this tube 312–R. Thus the upvolting leading edge from 427 of a long impulse on the grid of this tube is sufficient to overcome the negative bias and consequently the tube 312–R becomes conducting and a downvolting pulse is applied over conductor 182 as previously described to the left hand grid of trigger tube 344 (Figure 8). Thus the reception of a long pulse subsequent to the first short pulse (which operates trigger 336) causes operation of relay D in the same manner as does the reception of three short pulses arising during the scanning of a single line.

*Determination of characteristic E*

This characteristic concerns the reason for termination of the first zone and specifically the termination of that zone because the stroke being followed terminates. This is but one way in which the first zone may terminate. It is important to determine whether the zone ends because of the termination of the stroke, since, for example, a "3" may have its first zone terminated because the first stroke terminates, whereas a "5" may not.

It will be recalled that a stroke is followed by determining whether that stroke falls within the time period represented by the ϵ space. If, therefore, a stroke which is being followed no longer falls into the ϵ space, then that stroke must have terminated. In order to determine this characteristic, pulses which fall into the ϵ space are registered in the trigger tube 322 (Figure 6), which tube is restored to its normal condition, that is, with the left hand section conductive, at the end of each scanning line, this being accomplished in the manner hereinbefore stated by connecting the right hand grid of tube 332 to conductor 166 (Figures 6, 7, 10, 9, 8) which carries downvolting line-end pulses.

The trigger tube 322 is caused to reverse when a downvolting pulse is fed over conductor 186 (Figure 6), from the plate of tube 321–R. The grid of tube 321–R is connected by means of conductors 187 and 148 to the plate of the ϵ space control tube 305–L. As has been stated, the output of tube 305–L is an upvolting pulse which occurs only when the signal falls within the ϵ space. The output signal from tube 305–L in addition to being connected back to the control grids of gating tubes 303–L, 304–L, 316–L and 317–L, is applied over the conductor 187, as just described, to the grid of tube 321–R. Thus if a signal falls within the ϵ space a 321–R. Thus if a signal falls within the ϵ space a downvolting pulse is applied over conductor 186 to the grid of tube 322–L causing that tube to reverse its state.

Figure 7:
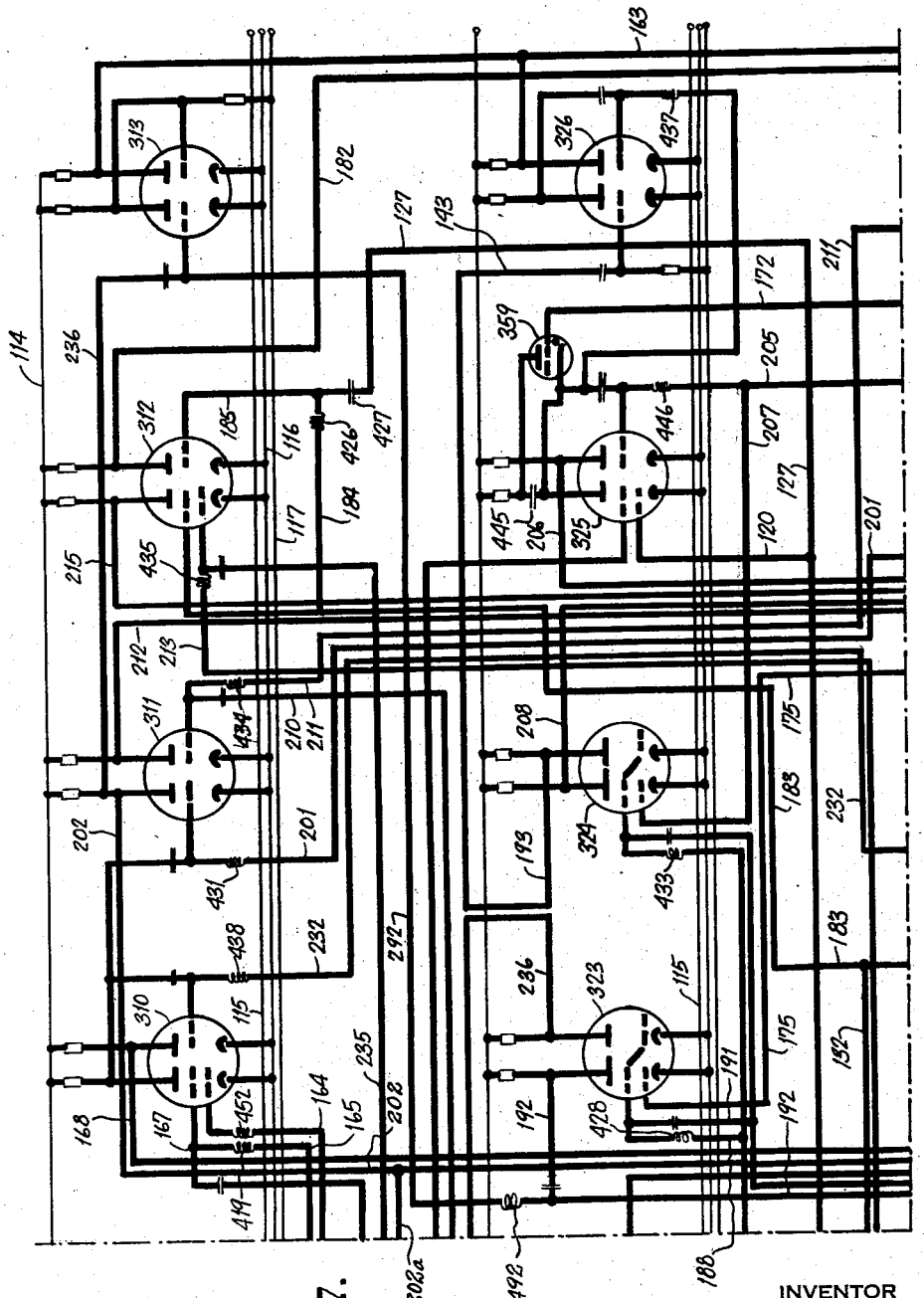

It will be seen, therefore, that if no pulse has fallen within the ϵ space, tube 322–L (Figure 6) remains conductive and a negative bias is applied by means of conductor 188 and impedance coil 428 to the upper grid of tube 323–L (Figure 7). If the lower grid of tube 323–L is upvolted, which it will be during the first zone since tube 337 will have been triggered and will cause a positive bias to be applied over conductor 175 (Figures 10 and 7), then when the upvolting end-of-line impulse is applied to the upper grid of tube 323–L over conductor 172 (Figures 8, 9, 10 and 7) and conductor 191 (Figure 7), tube 323–L will supply a downvolting pulse over conductors 192 (Figures 7, 10 and 9) to the left hand grid of trigger tube 345. This tube will then reverse and energize relay E to indicate that the first zone terminated because the stroke being followed terminated.

*Determination of characteristic F*

This characteristic, as has been previously stated, is the presence or absence of a second zone. The determination of this characteristic is based upon the occurrence of some recognizable event. If zone Z–2 is operated in, then zone indicator trigger 338 is reversed and a downvolting bias is applied from its right hand plate over conductors 198 and 199 to the grid of tube 318–R.

If during this zone something occurs then an upvolting pulse is applied from conductor 118, which receives all pulses supplied by the iconoscope, to this same grid of tube 318–R.

A downvolting pulse is then provided at the plate of 318–R which is applied over conductor 195 to trigger 346.

Trigger 346 then reverses and relay F operates indicating that something happened in zone Z–2.

*Determination of characteristic G*

This characteristic is expressed as a determination of whether there is a scanning line in the second zone on which an additional pulse occurs to the right of the stroke being followed. It will be seen that in order to detect this all the pulses in the line must be considered, not only those which are present in the ϵ space. What is to the right of the stroke being followed is determined by the tubes 304–R and 317–R, which will produce positive sine wave pulses which fall to the right of the ϵ space. The sine pulse from one or the other of the tubes 304–R or 317–R (Figure 5) will then be transmitted over conductor 196 (Figure 5), and conductor 197 (Figure 6) to the upper grid of tube 321–L (Figure 6). The lower grid of tube 321–L will have a negative bias thereon due to the operation of counting trigger 338, the right hand half of which is conductive at this time due to the fact that tube 338 has reversed as a result of counting the zones. This negative bias will be placed on the grid mentioned by virtue of the connection over conductor 198 (Figures 10, 9 and 6) from the right hand plate of tube 338 to the coil 430 and to the lower grid of tube 321–L. Then when an upvolting positive signal pulse from the iconoscope, whether long or short, is transmitted over conductor 118 (Figures 5 and 6) to the lower grid of tube 321–L, it, in combination with the positive sine wave pulse on the upper grid, overcomes the negative bias mentioned and the tube 321–L conducts producing a downvolting pulse which is applied over conductor 200 to the left hand grid of the trigger tube 347. Trigger tube 347 then reverses causing operation of relay G to indicate that in the second zone there was on a particular scanning line a signal pulse which occurred to the right of a pulse generated by the stroke being followed.

Determination of characteristic H

Characteristic H is that there is a change of direction of the stroke being followed in the second zone. When there is a change in the direction of the stroke being followed tube 310–L operates to indicate this fact, that is, the right hand section of that tube becomes conductive. The manner in which this occurs has been described in detail in connection with characteristic B. In brief, when both directions have been indicated by the fact that a positive bias is applied to both the upper and lower grids of tube 310–L, then a downvolting line-end pulse applied to the upper grid of that tube will cause it to pass an upvolting pulse which will be applied to the grids of tube 310–R and tube 311–L. Due to the fact that zone counter tube 337 has restored to its normal mode and 338 has reversed, a positive bias will now be placed on the grid of tube 310–R over conductor 232 (Figures 10 and 7) and coil 438 and a negative bias will be placed on the grid of tube 311–L over conductor 201 and coil 431. As a result, no pulse passes through the tube 310–R but tube 311–L provides a downvolting pulse over conductor 202 (Figures 10, 9 and 8) to the left hand grid of feature trigger tube 348. This tube reverses and causes operation of relay H to indicate that there was a change of direction of the stroke in the second zone.

Determination of characteristic I

Characteristic I is that there is a scanning line in the second zone on which the stroke being followed is intersected by a horizontal line.

If the stroke being followed is thus intersected by a horizontal line no pulse will occur in the ε space but instead there will be a constant voltage during a long duration pulse resulting from the horizontal line of the numeral. If the positive voltage resulting from this pulse coincides with positive voltage in the ε space then the capacitor 445, which is in the plate circuit of the tube 325–L (Figure 7) will become charged. The upper grid of tube 325–L has thereon positive peaks of sinusoidal voltage representing the ε space, these peaks being transmitted over conductor 203 (Figures 6 and 7) from the secondary of transformer 417. The lower grid of tube 325–L is connected to conductor 120 (Figures 7, 6 and 5). Conductor 120 receives only long impulses due to the use of the pulse separator 65 (Figure 1). Thus when the two voltages coincide, as stated above, capacitor 445 is charged. When the upvolting end-of-line pulse is received on conductor 172 is renders gas tube 359 conductive discharging the condenser through this tube. The upvolting pulse thus produced can pass through tube 325–R provided that scanning is proceeding in zone Z–2 since a negative bias will then be present on the grid of tube 325–R, being supplied from the right hand grid of the second zone counter tube 338 over the conductor 205 (Figures 10 and 7) and choke coil 446. The output pulse from tube 325–R is then communicated over conductor 206 (Figures 7 and 10) to the left hand grid of trigger tube 350 causing it to downvolt and causing reversal of that tube and energization of relay I to indicate that there was a scanning line on which the stroke followed was intersected by the horizontal line.

Determination of characteristic J

Characteristic J is whether the second zone terminates due to the fact that the stroke being followed terminates. This determination is effected in the same manner as the corresponding determination in the first zone (characteristic E) but it is effected by use of tube 324–L rather than tube 323–L. By utilizing tube 324–L the determination is based upon zone Z–2 since this tube is controlled by the zone counter tube 338 associated with zone Z–2 rather than by the zone counter tube 337 which is associated with zone Z–1.

As was stated in connection with characteristic E, if no pulse has fallen within the ε space the tube 322–L remains conductive. Under these circumstances a negative bias is applied by means of conductor 188 and impedance coil 433 (Figures 6 and 7) to the upper grid of tube 324. If the lower grid of this tube has been upvolted, as it will be during the second zone since tube 338 will have been triggered causing a positive bias to be applied over conductors 205 and 207 (Figures 10 and 7) to the grid, then when the upvolting end-of-line impulse is applied to the upper grid of the tube 324–L over conductor 172 (Figures 7, 10, 9 and 8) this tube will conduct and a downvolting pulse will be applied over conductor 208 (Figures 7 and 10) to the left hand grid of trigger tube 351. This tube will now reverse and cause operation of relay J, thereby indicating that the second zone terminated because the stroke being followed terminated.

Determination of characteristic K

Characteristic K is that in the third zone, provided there is a third zone, there is a region of the stroke being followed in which the stroke is inclined downwardly toward the left.

As has been clearly indicated during the discussion of the following of a stroke an inclination of the stroke being followed toward the left is detected in tube 303–L (or 316–L) and results in reversal of trigger tube 307 (Figure 6). A pulse is then applied by means of conductor 210 (Figures 6 and 7) to the grid of tube 311–R upvolting that grid and causing the tube to conduct if zone counter tube 340, associated with the third zone, has been triggered so that a negative bias is applied to tube 311–R from this source over conductor 211 (Figures 10 and 7) and through the impedance or choke coil 434. When the tube 311–R becomes conductive a downvolting pulse is applied over conductor 212 (Figures 7 and 10) to the left hand grid of trigger tube 352. This tube then reverses and the relay K associated therewith becomes operative and indicates that there was a region of the stroke being followed in the third zone in which the stroke inclined downwardly to the left.

Determination of characteristic L

This characteristic is that the numeral has a stroke which is interrupted. Generally this will occur only in the case of the numeral five which, due to the usual mode of formation, may readily have the upper generally horizontal stroke thereof separated from the remainder. The fact that there is an interruption is not associated with any particular zone. It is determined whenever it occurs.

It will be recalled that trigger tube 336 (Figure 10) is reversed upon the reception of the first short impulse and thus serves as one of the zone counting tubes and indicates when zone Z–0 has terminated and zone Z–1 has begun. When tube 336 reverses an upvolting bias will be applied over conductors 131 (Figure 10) and 183 (Figure 7) to the upper grid of tube 312–L (Figure 7). Moreover, a negative bias will be applied to the lower grid of tube 312–L, this bias originating at the anode of tube 328 (Figure 8) and being applied over conductor 213 (Figures 8, 5, 6 and 7). Tube 328 is the first of the counter tubes which count the pulses per line and this tube will operate during each scanning line in which a pulse is received. If a pulse has not been received in any particular line, then tube 328–L will be conductive and a negative bias, as stated, will be applied over conductor 213 (Figures 8, 5, 6 and 7) and through choke coil 435 to the lower grid of tube 312–L indicating the existence of a line without a pulse, i.e. an interruption.

Any new pulse on this grid will prevent conduction in that tube, but upon reception of a new impulse on the lower grid which new impulse is upvolting and is supplied over conductor 148 (Fig. 6), conductor 187 (Fig. 6) and conductor 235 (Figures 6 and 7) from the plate of tube 305–L, conduction will occur and a downvolting pulse will be applied over conductor 215 (Figures 7 and 10) to the left hand grid of tube 353 which will then reverse causing operation of relay L to indicate that there was an interruption in the stroke of the numeral.

Transition from one zone to another

As has been indicated hereinabove, transitions from one zone to another occur in various ways. Thus, transition from zone Z–0 to zone Z–1 occurs when the first short signal impulse is received in the system; transition from zone Z–1 to zone Z–2 will occur when the stroke which was being followed terminates; transition from zone Z–1 to zone Z–2 may occur when there is a change in direction in zone Z–1, but in this event only when the stroke being followed was at all times alone in zone Z–1; transition from zone Z–2 to zone Z–3 will occur whenever a change in direction of stroke from left to right has occurred during zone Z–2 and additionally if a change from right to left has occurred during zone Z–2 under certain circumstances, namely, if the first zone was not terminated because the stroke being followed in that zone ended or if there is a change back to the right; transition from either zone Z–1 to zone Z–2 or from zone Z–2 to zone Z–3 will occur due to the fact that that stroke being followed was alone but is not now alone.

Transition from zone Z–0 to zone Z–1

As has been indicated, the period during a frame in which scanning occurs without the production of signal pulses from the iconoscope or other scanner is for convenience treated as a zone and designated Z–0. Included in this zone is any period during which long pulses occur prior to the first short pulse.

Stated somewhat differently, the scanning is non-effective until a stroke which is inclined and the direction of which is therefore determinable is encountered by the scanning beam and when this occurs the identification circuits are "opened."

Referring once again to Figures 5 through 10, the signal pulses are transmitted over conductors 118, 120 and 121 (Figures 1, 5 and 8) from the pulse separator to the identification circuits. A long pulse transmitted over conductor 120 (Figures 5, 6 and 7) to the lower grid of tube 325–L is without effect since the upper grid is not at this time supplied with its positive sine wave pulses which are necessary to cause conduction therein. This is so because oscillator tubes 302 and 315 are not oscillating and therefore no sine wave pulses are supplied from transformer 417. As a result, long pulses do not enter the system.

When the first short pulse is transmitted as will be the case when the scanning beam strikes an inclined stroke this upvolting pulse is applied to the grids of tubes 327–L and 327–R (Figure 8). The grid of 327–R, however, has a sufficiently low negative bias as a result of the control exerted by the trigger tube 314 (Figure 5) to permit conduction.

Tube 327–L is not conductive as a result of its downvolted bias, this tube being independent of tube 314. Because of this an upvolting pulse applied to the grid of tube 327–L is always effective (i.e. tube 327–L serves as an input amplifier) but a negative terminating pulse applied to the input condensers 123 and 124 is not effective since the amplitude thereof is not sufficient to permit conduction.

The first negative pulse produced in the output of tube 327–R serves the function of reporting to the system that the numeral sensing and particularly the following of a stroke has begun. This negative impulse is applied over conductor 130 (Figures 8, 9 and 10) to the left hand section of the trigger tube 336 which tube has its two sections connected in a flip-flop or trigger circuit with the left hand side initially conductive as a result of the interruption in the ground lead to the tube cathodes at the end of each frame as previously described.

The downvolting pulse applied to the left hand grid of tube 336 causes a reversal and the right hand section becomes conductive. All of the trigger tubes of the system are assumed to initially be in position in which their left hand sections are conductive and their right hand sections cut off. Therefore, in this tube and in all tubes an initial positive pulse on the left hand grid has no effect nor does a negative pulse on the right hand grid. In these trigger tubes, a positive pulse of long duration with large amplitude applied on the right hand grid might effect a reversal but such long duration pulses are not permitted on these grids due to the use of well known arrangements for pulse separation as previously mentioned.

The reversal of the zone counter trigger tube 336 causes operation of other tubes and serves to advise different points in the circuit that the effective sensing of the numeral has commenced. From this time on long pulses can also occur in the system since tube 312–R (Figure 7) is not prepared for conduction as a result of the positive bias from the right hand grid of tube 336 to its grid via conductors 183, 184 and coil 426 and conductor 185 (Figures 10 and 7).

Additionally, the oscillators 302 and 315 (Figure 5) are released but do not start to oscillate, this release function being effected by applying a positive bias from the left hand plate of tube 336 (Figure 10) over conductors 183 (Figures 10 and 7), 132 (Figures 7, 6 and 5) and through coil 447 to the grid of 302 and at the same time through conductor 133 and coil 448 to the grid of tube 315.

Figure 10:
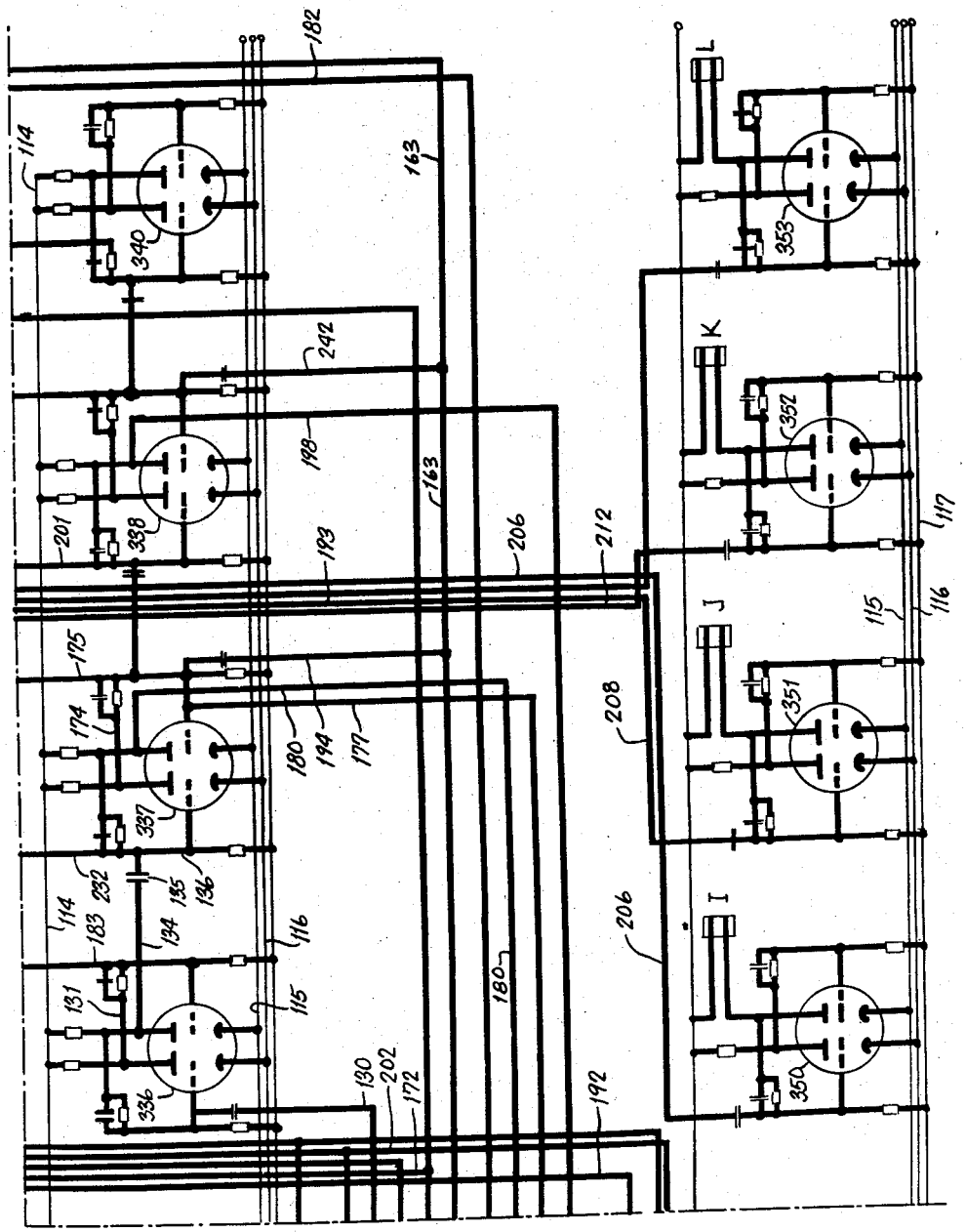

Moreover, a downvolting output pulse from the right hand plate of tube 336 is applied via conductor 134, condenser 135 and conductor 136 to the left hand grid of the zone counter tube 337 (Figure 10). Tube 337, therefore, reverses and its reversal indicates that zone Z–1 has commenced.

Change of zone due to termination of the stroke being followed

The mode in which transition from zone Z–1 to zone Z–2 is caused to occur as a result of the termination of the stroke being followed has been described in considerable detail in connection with the determination of characteristic E and was made apparent in the section describing that determination. Such termination is effective to render tube 323–R (Figure 7) conductive and this tube registers the termination of the stroke being followed independently of the zone. Tube 323–R then applies a downvolting pulse over conductor 236 (Figures 7, 6 and 5) to trigger 314 (Figure 5) to reverse that trigger. The reversal of trigger 314 permits tube 327 (Figure 8) to pass the pulse resulting from the next following stroke, that is, the stroke furthest to the left as the following line is scanned and thus the following of a new stroke commences.

At the same time that tube 323–R becomes conductive, i.e., is upvolted, 324–R likewise is upvolted, such upvolting resulting from a line end impulse applied over conductor 172 and 191 to the grid 323–R and 324–R. As a result of the upvolting of the tube 324–R a downvolting pulse is applied over conductor 193 (Figure 7) to the grid of tube 326–L which grid then causes tube 326–L to apply an upvolting pulse to tube 326–R. The function of the bias through coil 437 will be described later. A downvolting pulse is then supplied over conductor 163 (Figures 5, 7, 10 and 9) to the right hand grids of zone counter tubes 337 and 338 which will effect the setting of the counter tubes to the following zone and alter conditions in various other tubes in accordance with that setting.

*Change of zone as a result of change in direction of a stroke*

FROM ZONE Z-1 TO ZONE Z-2

A change in direction of the stroke being followed results in a transition from the first to the second zone only if the stroke being followed was at all times alone in the first zone.

When a direction to the left is determined, this is registered in tube 307 (Figure 6) and when a direction to the right is determined, this is registered in trigger tube 308 (Figure 6). When during a single zone both of these tubes have reversed then both grids of tube 310-L (Figure 7) are biased positively and upon the arrival of the following downvolting line-end impulse over conductors 166 and 167, the upper grid of tube 310-L is downvolted. Then the grids of tubes 310-R and 311-L are upvolted and a downvolting pulse is transmitted over conductor 168 to trigger tube 342 (Figure 8). (Tube 311-L does not operate due to the bias applied to its grid over coil 438 and conductor 232 from zone counting tube 338.)

Tube 342 reverses and indicates that a change of direction has occurred as described in detail in connection with feature B.

Additionally, the operation of tube 310-R causes the grid of tube 333-R to be downvolted due to the connection of that grid to conductor 221 (Figures 10 and 9) and hence to conductor 168. Tube 333-R is biased over conductor 220 from the plate of tube 334-R (Figure 9) and can operate only if 334 has reversed. Tube 334 is controlled by the counting tube 330 (Figure 7) which reverses when the first pulse of a scanning line is received and returns to its normal mode when a second pulse is received on any scanning line. Thus, if the stroke being followed was at all times alone tube 330 will have been in its alternate mode and also tube 334 will have been in its alternate mode due to the connection from the left hand plate of 330 over conductor 182 to the left hand grid of 334. Consequently, if the stroke was not at all times alone then a negative bias will be applied over conductor 220 and coil 436 to the grid of tube 333-R but if the stroke was at all times alone then that bias is positive.

When the latter condition obtains the downvolting pulse from tube 311-L applied to the grid causes an upvolting pulse to be applied over conductor 222 (Figures 6 and 9) to the grid of tube 335-R. The pulse is inverted in 335-R and applied over conductor 223 to conductor 163 (the end of zone conductor). Then counting tube 337 (because zone Z-1 is operated in), receives a pulse over conductor 194 and the particular tube involved restores to normal at the same time causing the following tube 338 to reverse.

FROM ZONE Z-2 TO ZONE Z-3

If a change in direction causes a transition from zone Z-2 to zone Z-3 the two cases heretofore described must be distinguished, that is, a distinction must be made between a zone change when (*a*) the preceding zone did not terminate because the stroke being followed terminated, and, (*b*) the preceding zone terminated because the stroke being followed terminated.

In case (*a*) above, that is, when zone Z-1 did not terminate because of the termination of the stroke being followed in that zone, then any change in direction whether from right to left or from left to right will cause a transition from zone Z-2 to zone Z-3.

Each change in direction is registered as an upvolting bias on both grids of tube 310-L as has been previously described under the heading Termination of characteristic H.

Since operation is now proceeding in zone Z-2, the resultant direction-change pulse produced on the plate of tube 311-L is not only fed over conductor 202 (Figures 7, 10 and 9) to feature trigger tube 348 (which indicates a direction change in zone Z-2) but it also fed over conductor 236 (Figure 7) to tube 313-L indicating in that tube also that there was a direction change in zone Z-2.

If now the preceding zone Z-1 did not terminate because the stroke being followed ended, then feature trigger tube 345 (Figure 8) is not reversed, but is rather in its normal position. This upvolts the grid of tube 345-L and also, over conductor 192, coil 492 and conductor 292, upvolts the grid of tube 313-L. As a result the downvolting direction-change pulse originating at tube 311-L can pass through tube 313-L and produce an upvolting pulse which, after inversion in tube 313-R, provides a downvolting pulse on the end of zone conductor 163.

In this manner each direction change in zone Z-2 whether from right to left or left to right will result in a zone change.

Condition (*b*) mentioned above, namely, a change in direction in zone Z-2 when zone Z-1 terminated because the stroke being followed therein ended, is governed by the sense of the direction change. A direction change from right to left will not cause a zone change, but every direction change from left to right, even if preceded by a change from right to left, will cause a zone change.

In order to determine the sense of a direction change it is necessary to know the initial direction of the stroke being followed in zone Z-2. This is detected in exactly the same manner as the initial direction in zone Z-1 (described under the heading Determination of characteristic A) save that determination is made in tube 306-L for zone Z-1 and in tube 306-R for zone Z-2.

If the initial stroke in zone Z-2 is downwardly to the right then the upvolting pulse from tube 316-R over conductor 155 (Figures 5 and 6) will pass through tube 306-R since its grid is downvoltingly biased from trigger tube 338, associated with zone Z-2. The downvolting pulse produced is fed over conductor 237 (Figure 6) to trigger tube 320 which reverses, thereby indicating that the initial direction in zone Z-2 was to the right. Since the initial direction was to the right a change of direction must necessarily be one from right to left, that is to say, one which will not affect the zone counter triggers. The downvolting pulse from tube 311-L (which indicates a direction change in zone Z-2), although fed over conductors 202 and 225, cannot pass tube 333-L due to the downvolting bias supplied over coil 459, and conductor 238, from the trigger 320, which trigger is reversed when the initial direction is to the right.

On the contrary, if the initial direction in zone Z-2 is to the left, tube 316-R does not produce a pulse and therefore trigger 320 remains in its original position with its left hand grid upvolted. Also the grid of tube 333-L is upvolted over conductor 238 and coil 459. As a result, the downvolting direction-change pulse from tube 331-L passes through tube 333-L, is then inverted in tube 303-R and supplied as a downvolting pulse to the end of the zone conductor 163 indicating that Z-2 ended, this time due to the fact that there was a direction change from left to right.

There remains the possibility that there may be a direction change from left to right succeeding a change from right to left which did not cause a direction change. As has been stated, each direction change from left to right must cause a zone change. In this case the transition is produced in the following manner: There are three directions which must be considered, namely, an initial direction to the right, a second direction to the left (the first change in direction) and a third direction, again to the right (the second change in direction).

The initial direction to the right is recorded as has been described in triggers 308 and 320 by reversal thereof. The second direction, that is, to the left, causes reversal of trigger 307. Thus a direction change is registered on the grids of tube 310–L. The downvolting direction-change pulse from tube 311–L is also fed back over conductors 202, 202a and condenser 449 to the right hand grid of tube 307 reversing this tube to its original position.

Now tube 316–R receives an upvolting bias from tube 307 over conductor 159 and coil 469 and can again detect a direction to the right. As a consequence, if there now occurs a second direction to the right the downvolting pulse on the plate of tube 304–R (317–R) can pass through tube 316–R producing an upvolting impulse which is applied over conductor 155 to tube 306–R. The pulse is inverted in this tube and is applied to the right hand grid of trigger 320 which then reverses into its normal position and has its left hand grid upvolted over conductor 238 and condenser 451. This produces an upvolting pulse which is inverted in tube 303–R; the consequent downvolting pulse is applied to the end of zone indicating conductor 163 which in the manner previously described causes restoration of the zone counter tubes to their normal position and indication that zone Z–2 has ended.

Summarizing, it will be seen that any change in direction from right to left will produce such a transition only if either the preceding zone Z–1 was not terminated because the stroke being followed in that zone terminated or there was a following change from left to right.

*Change of zone due to the fact that the stroke being followed was not alone but is now alone*

There is a transition from the first to the second zone or from the second to the third zone whenever the condition mentioned in the foregoing heading occurs.

It will be recalled that the first pulse on a scanning line due to the beam encountering a stroke of the numeral will cause a pulse to be applied to conductor 147 actuating trigger 328 which in turn actuates trigger 330. The second downvolting pulse resulting from the beam encountering a second stroke on the same scanning line causes a second impulse on lead 147. Since the pulse is applied to the left hand grid of tube 328 and to the right hand grid of tube 330, trigger 330 restores to its normal mode. This restoration applies a downvolting pulse over lead 182 to the left hand grid of trigger 334, actuating it to its alternate mode and upvolting the upper grid of tube 335–L. This upvolting conditions tube 335–L to conduct signals applied to the lower left hand grid, provided that grid is properly biased.

At the end of a line a clearing pulse is applied to lead 166 (as already described) and returns to their original modes those of the triggers 328—331 which have been actuated. The clearing pulses are downvolting and are applied to the right hand grids of triggers 328—331. However, trigger 334 is not cleared at each line end but only at a zone end and so if it has been actuated because there was a scanning line on which there were two or more strokes, it remains actuated.

If on a succeeding line there is but one stroke, that stroke will provide an impulse which will actuate trigger 330, thereby applying a negative bias over conductor 170 and through coil 454 to the lower grid of tube 335–L, reducing that grid from saturattion to a condition such that it can amplify any positive pulse that may come along. Since it is postulated that there is but a single stroke on the line under discussion, the positive upvolting line end impulse from lead 172 applied to the lower grid of tube 335–L finds that tube in proper amplifying condition. This pulse is inverted in tube 335–L and applied to lead 163 and from there to the zone end triggers 337 and 338 and to trigger 334 to denote the beginning of a new zone.

*Effect of zone end on following of a stroke*

The stroke being followed is not affected by a change in zone except in the case in which the zone changes as a result of the termination of the stroke being followed. In the other two cases set forth above the stroke being followed continues to be followed.

Moreover, no change takes place as a result of the termination of a stroke unless the termination is an actual rather than an apparent one. For example, in the case of crossbars or heavy portions of the stroke extending substantially horizontally arrangements are made to prevent termination of the stroke until the crossbar or loop itself terminates.

This is controlled by the tube 326–R which is controlled by tube 325–R and also by tube 324–L. In brief, when a stroke terminates it is indicated by tube 324–L, a downvolting pulse from which is then placed on the grid of tube 326–L. This will result in an upvolting pulse on the grid of tube 326–R. If the bias from gas tube 350 over conductor 231 and impedance 437 to the grid of tube 326–R is downvolting, i.e., if the ε space is filled by a crossbar or loop, then tube 326–R cannot conduct until the bias is removed, or, in other words, there can be no indication of the termination of the stroke until the ε space is empty.

*The various forms of the numerals which the mechanism will identify and the wiring of relays A through L to accomplish the final identification*

Referring now to Figures 11, 12 and 13, it will be seen that for each numeral designated in bold face at the top of the column there are shown numerous forms. Some of the numeral forms are complete in the first zone such, for example, as the forms of numeral 1 indicated in the column under the small heading A whereas others are complete only in two or three zones. An example of a two-zone numeral is "2" and an example of a three-zone numeral is "3."

As shown in Figures 11, 12 and 13, the numeral 1 is distinguished from the numeral 7 only on the basis of the use of a European type 7 having a central crossbar. However, it will be understood that when the device is used in situations wherein the American type 7 is employed, then only the forms of the numeral 1 shown in column 1AZ1 and 1BZ1 and terminated as in 1BZ2, col. 1 are identified as the numeral 1 and those shown in column 1BZ1 and terminated as in 1BZ2, col. 2 are identified as 7's. In order to accomplish this a switch may be provided by means of which the interconnections of the relay contacts are modified so that in one setting all of the forms of the numeral 1 shown in the column heading 1 are identified as being the numeral 1 whereas in the other position only those forms of the numeral 1 shown in 1A and 1BZ1 as terminated in the left column under 1BZ2 are so identified, the remaining forms (i.e. those in 1BZ1 as terminated by the terminations of 1BZ2, col. 2) being identified as 7's due to the fact that the lead from relays normally operative to identify the numeral as a 1 is connected to relay contacts associated with the numeral 7. These relay connections together with the switch mentioned are described in greater detail when the specific connections of the contacts of the characteristic identification relays are described.

Immediately below each column in which a variety of similar forms of the same numeral appears is a schematic designation of the mode in which the contacts of the twelve relays are to be interconnected in order, by their operation, to select for completion a single circuit may then be utilized to energize any of the usual devices to register or record the numeral read. For example, the circles at the bottoms of Figures 11, 12 and 13 and designated with the numerals 1 through 9 and 0 may represent relays, solenoids, or other devices which when operated will cause entry of the digital value into an accumulator, a printer, a punch or any other device which may be desirable in order to indicate and/or record the numerals identified from the written record.

Figures 14, 15 and 16 are somewhat less diagrammatic representations of the relays appearing on the lower half of Figures 11, 12 and 13 respectively. In Figures 14, 15 and 16 each of the individual small rectangles appearing on each line represents an armature and contacts of a relay and thus the entire line represents all contacts of that relay. The central vertical line of each rectangle represents an armature thereof and the lines at the bottom at either side of this central line represent contacts cooperating with that armature, the line to the left representing a contact against which the armature rests when the relay is unoperated and the one to the right representing a contact against which the armature rests when the particular relay is operated. The designations appearing at the left of each of Figures 14 through 16 identifies the relay by association with the feature mentioned above, the presence of which causes the relay to become operative. Additionally, the horizontal dotted lines extending across these figures separate the relays associated with features of one zone from those of another zone.

In order to care for use of either the European or American type of "7" certain relay contacts are interconnected. Thus as shown in Figure 14 the right hand contact of relay J is connected to the arm of a switch designated 480, this switch having two positions. When the switch is in its left hand position all of the varied forms of numeral shown under the heading "1" in Figure 11 are effective to pass through contacts of relays K and L associated with the numeral "1" and result in operation of the associated registering or recording device. If the switch arm is upon its right hand contact, then that contact of relay J (which is associated with those forms of numeral appearing in column 1BZ1 and terminated in one of the manners shown in the left hand column under 1BZ2) will be connected by means of the conductor 295 to that armature of relay K which is associated with the numeral 7. When operating in European countries the switch will be thrown to the left hand position and all of the forms of the numeral "1" shown in column "1" of Figure 11 will be so identified, whereas when operating in America the switch will be thrown to the right hand position and then only those forms of the numeral 1 shown in column 1AZ1 and 1BZ1 as terminated by column 1 of 1BZ2, will be identified as 1's and those forms shown under column 1BZ1 and terminated in accordance with column 2 of 1BZ2 will be identified as 7's.

Selecting a particular form of numeral at random will illustrate the mode in which that numeral is identified. Thus if the numeral 5, which is represented by the beginning stroke shown fourth from the top in the first column under the heading BZ1, is combined with the central portion shown fourth from the top in the second column under the heading BZ2, and with the terminal portion shown in the fourth line of the second column under the heading BZ3 to produce a 5 appearing thus,  , then, as is indicated by the showing at the right of Figure 15, no contacts of relays A, B, C, D, G and I need be included in the circuit since the features designated by these letters are not important in the identification of this type of numeral 5. In brief, then, the initial stroke does not incline downwardly toward the right; the sign does not have a directional change in the first zone; there may not be in the first zone of the numeral a line on which only one pulse appears (or, to be more accurate, this determination is not utilized in connection with the numeral 5 and is intended to be and is used only to distinguish the numeral 0 from the numeral 6); there may or may not be in the first zone a line on which at least three pulses occur and the first zone does not terminate because the stroke which is being followed terminates, indicated by non-operation of relay E.

Further there is a second zone and this is indicated by the operation of relay F continuing the circuit from the operated contact of relay F to the armature of relay H (in this case the circuit does not pass through any armature of the relay G since the general form of numeral shown and chosen for this example does not have and cannot have a pulse to the right of the stroke being followed).

From the armature of relay H the circuit leads over an operated contact of that relay directly to the armature of relay J there being no armature of relay I included in the circuit since the general form of numeral 5 does not have a line on which the stroke being followed is intersected by a horizontal line.

Relay J is not operated because the second zone does not terminate as a result of termination of the stroke being followed. From the unoperated contact of relay J the circuit proceeds to the armature of relay K which relay is operated due to the fact that the stroke being followed inclines downwardly to the left and the circuit is therefore continued through the operated contact of that relay to the armature of relay L which latter relay is not operated since the form of the numeral 5 chosen for illustration is not interrupted. The circuit then continues through the unoperated armature and contact of relay L to the indicating or registering device "5," thus completing the identification of the numeral.

*Operation of the identification circuits in connection with the identification of a specific numeral*

The foregoing has described in considerable detail the circuits utilized to bring about operation of the various characteristic relays A through L and has described the manner in which the contacts of those relays are interconnected in order to cause operation of the final identification registering or recording devices "1" through "0."

In order, however, that a complete tracing of the operation of the circuits be available there is given in the following a complete description of the operation of these circuits in their time sequence in identifying the numeral 3 and particularly the specific form thereof shown in Figure 3 which form is also shown in its component parts in Figure 11, the parts being identified under the column and line designations of the various zones as Z–1, column 2, line 1, Z–2, column 1, line 3, and Z–3, column 1, line 3.

Referring now to Figure 3, it will be seen that as the scanning proceeds over lines 1 through 3 nothing occurs since no portion of the image of the numeral will be present on the iconoscope screen in the area of these scanning lines. However, when line 4 is reached the cathode ray beam strikes the upper edge of the numeral 3 and an output pulse of long duration is produced.

*First pulse from iconoscope (scanning line 4)*

The first pulse from the iconoscope is a long pulse and is applied over conductor 118 (Figures 8, 5 and 6) to the lower grid of tube 321–L. At this time the left hand section of trigger tube 338 is conductive (since all trigger tubes are in normal position) and therefore a positive bias from the right hand plate is applied over conductor 198 (Figures 10, 9 and 6) and through coil 430 to the lower grid of tube 321–L. Note that tube 318–R is biased over conductor 198 also. Because of this bias pulses over conductor 118 are without effect.

This pulse is also transmitted through coil 122 to conductor 120 and over that conductor (Figures 5, 6 and 7) to the lower grid of the tube 325–L (Figure 7). Also, this pulse is applied over conductor 127 (Figure 7) and through condenser 427 to the grid of tube 312–R.

There is no bias on the upper grid of tube 325–L at this time, due to the fact that the tube 304–R (Figure 5) is receiving no oscillations from 307 or 315 and, in addition, the negative bias on tube 312–R (Figure 7)

renders that tube section non-conductive, the bias being supplied over conductor 183 from the left hand plate of tube 336, therefore no effective operation occurs as a result of this long duration pulse. On scanning lines 5 and 6 similar long duration pulses are produced and are transmitted to the tubes mentioned in the same manner and likewise without effect.

*First short pulse (scanning line 7)*

However, on line 7 the scanning beam passes over a curved portion of the numeral 3 (point 73, Figure 3) resulting in the production of a pulse of short duration. This pulse is applied over conductor 121 (Figure 8) to condensers 123 and 124 and to the grids of tubes 327–L and 327–R (Figure 8). (This first short pulse is also applied to the lower grid of tube 321–L but without effect as set forth in connection with the description of the first long pulse.)

The grid of the tube 327–R has a sufficiently low negative bias to permit conduction, this as a result of the control exerted by the trigger tube 314 and applied over conductor 128. The upvolting pulse on the grid of tube 327–L is always effective since all short impulses are amplified and fed into the system over this tube. The upvolting pulse mentioned is inverted in tube 327–L and is fed as a downvolting pulse over conductor 147 to trigger tube 328. Tube 328 reverses indicating that scanning line 7 is not empty. Also the reversal of trigger 328 produces a downvolting pulse on trigger 330 which then also reverses, indicating that up until this time there was exactly one pulse on this scanning line.

The downvolting pulse over conductor 147 is also applied to the grid of tube 305–L at a time when oscillations have just begun. However, it is assumed that the pulse thus produced after amplification in tube 321–R is sufficient to reverse the trigger 322.

Since the inclination of the stroke being followed is slight and is considered to be vertical (the sine wave pulse produced in the ε space control tube 305–L is relatively wide) the signal applied to the grid of tube 305 will fall within this space. Consequently the gating tubes 316–L and 317–L will not pass any pulses. However, a pulse from the plate of tube 305–L will pass over conductors 148 and 187 (Figure 6) to the grid of tube 321–R which, as stated, will amplify and invert the pulse and apply it over conductor 176 to the left hand grid of trigger tube 322. This tube will then operate indicating that the pulse fell within the ε space.

When tube 327–R becomes conductive a downvolting pulse is produced in the output thereof. This pulse is applied over conductor 130 (Figures 8, 9 and 10) to the left hand grid of the trigger tube 336; to the left hand grid of the trigger tube 314 (Figure 5); and to both grids of the switch tube 301 (Figure 5).

Trigger tube 336 reverses and the right hand section thereof becomes conductive. An upvolting pulse is then applied over conductors 131 and 134 and through condenser 135 (Figure 10) to the left hand grid of trigger tube 337. Trigger tube 337 reverses and a negative bias is applied over conductor 232 and choke coil 438 to the grid of tube 310–R preparing that tube for operation.

Also, reversal of trigger tube 336 produces a positive bias which is applied over conductors 183 and 184 and through coil 426 (Figures 10 and 7) to the grid of tube 312–R and thus from this time on long pulses over conductors 120 and 127 may enter the system. Additionally, a positive bias is applied via conductors 183 (Figures 10 and 7) and 132 (Figures 7, 6 and 5) and through choke coil 447 to the lower grid of oscillator 302 and in a similar manner over conductor 133 and choke coil 448 to the lower grid of oscillator 315. Oscillators 302 and 315 are thus prepared for oscillation.

The reversal of trigger tube 314 resulting from the application of the negative pulse thereto over conductor 137, now causes tube 327–R to conduct. Since the trigger tube 314 cannot again reverse until the following of the stroke is completed 327–R remains conductive until this time.

The reversal of switch tube 301 (Figure 5) places an upvolting bias on the upper grid of tubes 302 and a downvolting bias on the upper grid of tube 315. The ε space oscillation commences in tube 302. Reversal of tube 337 applies an upvolting pulse from the left hand plate to the left hand grid of tube 338 where it is ineffective and also applies a negative bias from the right hand plate over conductor 180 (Figures 10 and 9) and through coil 425 to the left hand grid of trigger tube 332. This prepares for operation of tube 332 and thus prepares for possible detection of feature D.

A negative bias is also applied over conductors 180 (Figures 10 and 9) and 189 (Figures 9 and 6) and through choke coil 420 to the grid of tube 306–L (Figure 6) preparing this tube for operation, and preparing for possible detection of feature A.

Operation of trigger tube 337 also indicates that zone Z–1 is being operated in.

*Second impulse on scanning line 7*

The iconoscope beam as it continues its traverse of scanning line 7 strikes the right hand upper portion 87 of the numeral "3" at the point 91 and produces a second impulse on this scanning line which is applied over conductor 121 (Figure 8) to the grids of tubes 327–L and 327–R resulting in the application of a downvolting pulse from the plate of tube 327–L over conductor 147 to the left hand grid of tube 328 (Figure 5), the right hand grid of tube 330 (Figure 5), the right hand grid of tube 331 (Figure 5) and the grid of tube 305–L (Figure 6).

The application of this downvolting pulse to tube 328 is ineffective but the application to the grids of tubes 328 and 330 causes reversal thereof to its normal mode and consequent reversal of tube 331 to its alternate mode. The downvolting pulse on the grid of tube 305–L occurs outside the ε space when the sine wave from the transformer 417 is in positive phase so that 305–L remains conductive and no stroke direction is indicated.

Figure 9:
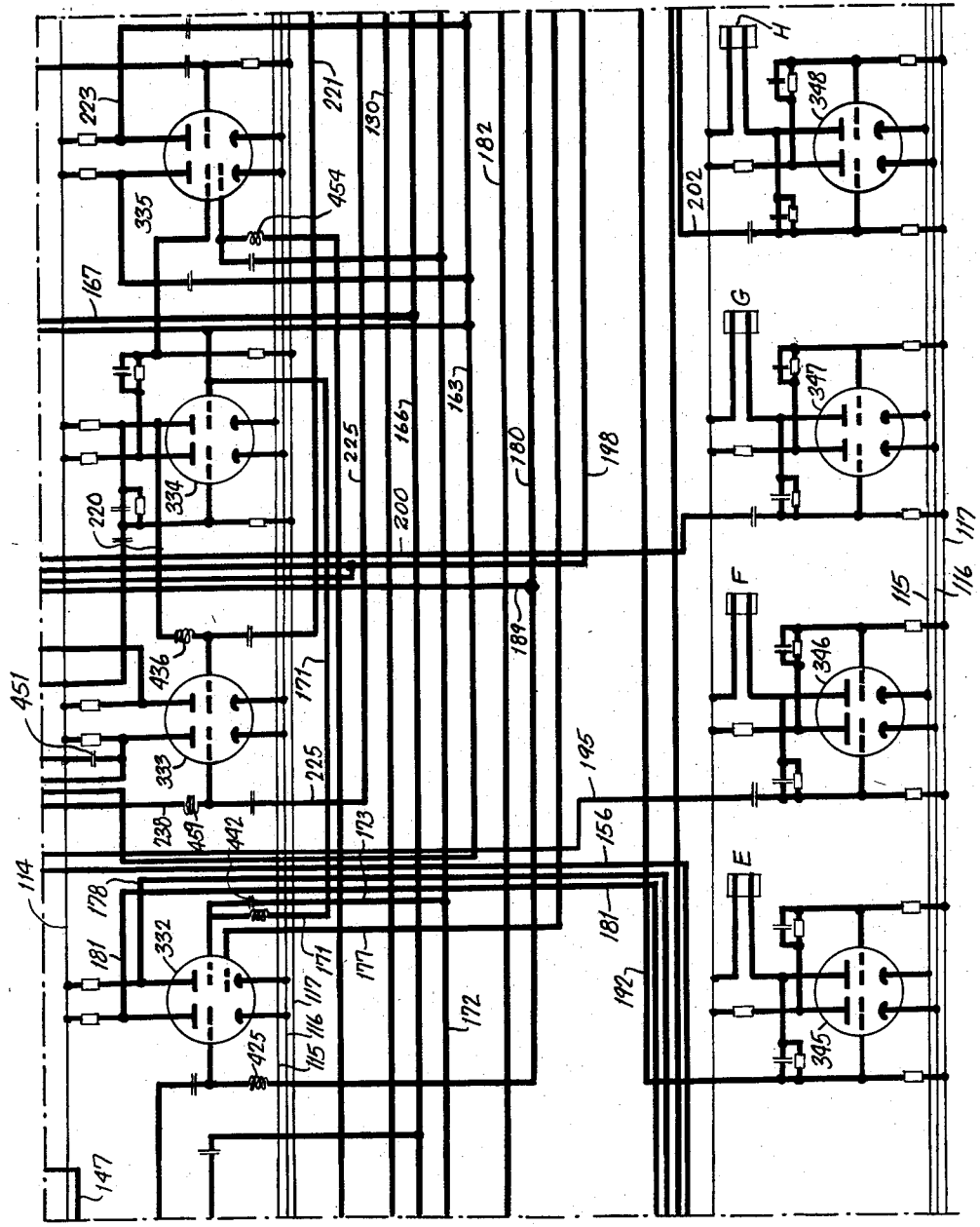

Restoration of tube 330 supplies a positive bias over conductor 170 (Figures 8 and 9) and through impedance coil 454 to the lower grid of tube 335–L (Figure 9). Also, the restoration of tube 330 causes a downvolting pulse to be placed on the left hand grid of trigger tube 334 over conductor 182 (Figures 8 and 9) indicating that there is in zone Z–1 a scanning line which crosses more than one stroke. Thus reversal of trigger 334 prevents operating of feature relay C since in the uppermost part the stroke was not alone and also assures that a direction change in zone Z–1 will not cause a zone change because the stroke was not always alone in zone Z–1.

The upvolting bias of grid 334–R applied over conductor 171 to the upper grid of tube 332–R serves, despite the position bias from the right hand plate of tube 337 (now in its alternate mode), to prevent that tube from operating. Also, the downvolting pulse applied to the left hand grid of trigger tube 334 causes reversal thereof and the application of an upvolting pulse to the upper grid of tube 335–L. This pulse is ineffective since tube 335–L is saturated due to the positive bias from tube 330.

*End-of-line pulse*

An upvolting end-of-line pulse occurring at the end of scanning line 7 is applied over conductor 172 to the upper grid of tube 332–R (Figure 6); to the lower grid of tube 335–L (Figure 9); to the upper grid of tube 323–L (Figure 7) and to the upper grid of tube 324–L (Figure 7) as well as to the grid of the gas tube 350 (Figure 7).

The pulse on the grid of tube 332–R is without effect because of the bias on this grid mentioned above.

The pulse on the lower grid of tube 335-L is also without effect because of the positive bias thereon from the right plate of tube 330. Also, the upvolting pulse on the upper grid of the tube 323-L is ineffective due to the positive bias on this grid from the left hand plate of operated trigger tube 322 over conductor 188, despite the positive bias on the lower grid of this tube from the left plate of operated trigger tube 337 (Figure 7). The upvolting pulse on the upper grid of tube 324-L is ineffective because of the positive bias on that grid arising at the left hand plate of operated trigger tube 322 as well as because of the negative bias on the lower grid produced at the left plate of the unoperated trigger tube 338 and applied over conductors 205 and 207 (Figures 10 and 7). The right grids of tubes 323-R and 324-R are directly connected to the upper grids of tubes 323-L and 324-L, respectively.

The upvolting pulse on the grid of the gas tube 350 (Figure 7) is ineffective since the condenser 445 has not been charged.

A downvolting line-end impulse again occurs over conductor 166 and is applied to the right hand grids of tubes 328, 330 and 331 (Figure 5) as well as to the right hand grid of trigger tube 322. As a result of this pulse, triggers 322 and 331 restore to normal, but triggers 328 and 330 (Figure 6), being in their normal positions, are not affected.

Scanning line 8

FIRST PULSE

As the beam of the cathode ray tube scans along line 8 it causes a pulse to be produced when the edge of the left upper stroke 85 of the numeral 3 is encountered as indicated at 92 in Figure 3. In the manner previously described a downvolting pulse is transmitted over conductor 147 to the left hand grid of trigger tube 328 and the right hand grids of trigger tubes 330, 331, as well as to the grid of tube 305-L (Figure 6) which latter tube, as has been described, controls the ϵ space.

In the manner previously described, trigger tubes 328 and 330 reverse. Also, since the downvolting signal produced coincides with the negative ϵ space portion of the sine wave pulse applied to the grid of tube 305-L (Figure 6), an upvolting pulse is produced on the plate of this tube which pulse is then applied over conductor 148 to the lower grid of tube 303-L (Figure 5) and to the lower grid of tube 304-L (Figure 5) without effect since these gating tubes are not open at this moment.

Additionally, however, the upvolting pulse from tube 305-L is applied over conductors 148 and 187 (Figure 6) to the grid of tube 321-R (Figure 6) and over conductor 235 (Figures 6 and 7) to the lower grid of tube 312-L (Figure 7).

Tube 321-R serves to invert this pulse applying a downvolting pulse over conductor 186 to the left hand grid of trigger 322 which then reverses indicating that there was a pulse in the ϵ space.

The upvolting pulse applied over conductor 235 to the lower grid of tube 312-L is without effect at this time since the lower grid is also supplied with a positive bias from the left hand plate of pulse counter tube 328 (Figure 8) over conductor 213 (Figures 8, 5, 6 and 7) and impedance coil 435, and the upper grid is supplied with a positive bias over conductor 183 from the left plate of operated trigger tube 336.

SECOND PULSE ON SCANNING LINE 8

As the scanning proceeds toward the right the iconoscope produces another pulse when the beam strikes the right hand stroke of the numeral 3, that is, at the point 93 of Fig. 3. This second pulse has the same effects which were described hereinabove in connection with the pulse transmitted from the iconoscope when point 91 of Figure 3 was struck by the beam and the various circuits involved will therefore not be again considered here.

End-of-line pulse

At the end of the line the upvolting and downvolting end-of-line pulses are produced in the same manner as was described in connection with the scanning of line 7 and as a result the trigger tubes 322 and 331 are restored to their normal mode as are trigger tubes 328 and 330.

Scanning line 9 commences

On scanning line 9, no pulse is produced by the iconoscope until the beam thereof strikes the second or right hand stroke of the numeral at the point 94 (Figure 3). When this occurs, a downvolting pulse is produced in the tube 327-L and is transmitted over conductor 147 to the left hand grid of tube 328 (Figure 8), the right hand grids of tubes 330 and 331 (Figure 8), and to the grid of tube 305-L (Figure 6).

The downvolting pulse on the left hand grid of tube 328 causes that tube to reverse and thereby triggers tube 330 which also reverses. At the same time and in the manner heretofore described in connection with scanning line 7, the negative pulse on the grid of tube 305 falls outside the space, 305-L remains conductive and no pulse in the ϵ space is indicated, that is, trigger 322 (Figure 6) is not reversed. It is to be noted that in lines 7 and 8 the trigger tube 322 had reversed when the second pulse occurred. It is obvious that the stroke being followed has terminated and the fact that trigger tube 322 does not operate indicates this because it indicates that no pulse fell within the ϵ space which would necessarily have been the case had the stroke being followed continued.

End-of-line pulse

The upvolting and downvolting end-of-line pulses occur in the manner heretofore described. At this time, due to the fact that trigger tube 322 has not reversed, i.e., is conductive in its left hand section, a negative bias therefrom is applied over conductor 188 and coil 428 to the grids of tubes 323-L and 323-R. Tube 323-L (upper grid) also receives an upvolting end-of-line pulse over conductor 166 and the lower grid thereof is supplied with a positive bias over conductor 175 (Figures 10 and 7) from the left hand plate of operated zone counter trigger 337.

Tube 323-L is rendered conductive due to the fact that the negative bias on the upper grid is overcome by the positive bias on the lower grid and the upvolting end-of-line pulse on the upper grid.

Also, tube 323-R conducts because due to the non-operation of trigger tube 322, it, instead of being saturated due to a positive bias, is supplied with a negative bias from tube 322 and can therefore conduct when the upvolting end-of-line pulse is received. Conduction in tube 323-R causes a downvolting pulse to be supplied over conductor 236 (Figures 7, 6 and 5) to the right hand grid of trigger tube 314. As was described under the heading Change of zone due to termination of the stroke followed, the reversal of trigger 314 permits the tube 327 (Figure 8) to count the next following stroke, that is, the stroke furthest to the left, as the following line is scanned and thus a new following of the stroke commences.

A downvolting pulse is also applied from the left hand plate of tube 323 over conductor 192 (Figures 7, 10 and 9) to the left hand grid of tube 345 causing reversal thereof and operation of relay E to indicate that the first zone has terminated because the stroke being followed has terminated.

At the same time that tube 323-R becomes conductive tube 324-R (Figure 7) becomes conductive. As a result of the conductivity of tube 324-R a downvolting pulse is applied over conductor 193 to the grid of tube 326-L causing this tube to apply a downvolting pulse from its plate over conductor 163 (Figures 7 and 10) to the right hand grids of the zone counter trigger tubes 337 and 338.

Tube 337 has already been reversed when the scanning passed from zone Z-0 to zone Z-1 but tube 338 is in its normal mode. Consequently the downvolting pulse on the right hand grid of tube 337 causes it to reverse to its normal mode applying a downvolting pulse over conductor 174 to the left hand grid of tube 338 which then reverses.

During the first zone, relays A, B, C and D have not been operated due to the conditions described in considerable detail hereinabove. Thus it is indicated that the numeral being scanned, that is, the particular form of the numeral 3 shown in Figure 3, does not have an initial direction to the right (the slope of the beginning portion of the numeral is so slight that the circuits merely indicate that it is vertical); does not have a change in the direction of the first stroke in the first zone; does not have in the uppermost part of the first zone a scanning line on which only one pulse appears (on scanning lines 7 and 8 two pulses appear and on scanning line 9, although a single pulse appears, this pulse does not effect operation of the trigger tube 343 or relay C because it is not in the uppermost part of zone Z-1); and does not have a line on which at least three pulses occur.

Additionally relay E has operated showing that the first zone terminated due to termination of the stroke being followed and relay F operated indicating a second zone Z-2.

Zone Z-2

The reversal of tube 338 applies a negative bias over conductor 198 (Figures 10 and 9), conductor 199 (Figures 9 and 6), and coil 459, to the grid of tube 306-R (Figure 6) and over conductor 198 and coil 430 to the lower grid of tube 321-L.

At the same time a positive bias is supplied from the left plate of tube 338 over conductors 205 (Figures 10 and 7) and 207 (Figure 7) to the lower grid of tube 324-L and over conductor 205 and coil 446 to the right hand grid of tube 325. As will be apparent from a study of the preceding description in conjunction with the wiring diagram the reversal of zone counting tube 338 is thus effective to bias the various tubes just mentioned so that they operate in accordance with the features allocated to the second zone.

Scanning line 10

As the cathode beam passes over the iconoscope mosaic a pulse is produced when the point 86 (Figure 3) is reached. This pulse is applied to the grids of tube 327-L and 327-R and produces a downvolting pulse on the plate of tube 327-L which is transmitted over conductor 147 in the same manner as has been previously stated to both the left hand grid of pulse counting tube 328 and the left hand grid of the ε space control tube 305 (Figure 6). Also, this downvolting pulse is applied from tube 327-R over conductor 140 to switch tube 301 (Figure 5). Switch tube 301 reverses and starts tube 315 in oscillation, at the same time permitting oscillations to die out in tube 302. Since the inclination of the stroke is slight and is considered to be vertical (the sine wave pulse produced in the ε space control tube 305-L is relatively wide) the signal applied to the grid of this tube will fall within this space. Consequently, the gating tubes 316-L and 317-L will not pass any pulses. However, a pulse from the plate of tube 305-L will pass over conductors 148 and 187 (Figure 6) to the grid of tube 321-R which tube section will invert the pulse and apply it over conductor 186 to the left hand grid of trigger tube 322 which will, of course, then operate indicating that the pulse fell within the ε space.

The end-of-line pulses now occur resulting in restoring tubes 328 and 330 as well as tube 322 to their normal modes. The zone counter tube 338 is maintained in its operated position.

Scanning lines 11 through 16

On these lines the trigger tube 322 of Figure 6 is operated by the ε space control tube 305-L once during each line but without effect since it is restored to its normal mode by the line-end impulses of each successive scanning line.

Scanning line 17

When the cathode beam strikes the point 88 on scanning line 17 a pulse is transmitted to tube 327 and as a result a downvolting pulse is applied over conductor 147 to the counting tube 328 and to the ε space control tube 305-L. 328 reverses in the manner already described supplying a downvolting pulse to the left hand grid of tube 330 which also reverses. The upvolting pulse from tube 305-L is applied to gating tube 316-L at a time when this tube is open. Consequently, a downvolting pulse is produced at its plate, is applied over conductor 157 (Figures 5 and 6) to the left hand grid of trigger tube 307 and also from the same conductor to the upper grid of tube 318-L.

The reversal of tube 307 is effective to indicate a stroke direction to the left and at its left hand plate produces a positive bias which is applied over conductor 165, coil 419 and conductor 167 to the upper grid of tube 310-L.

Tube 318-L produces an upvolting pulse which is transmitted over conductor 234 (Figure 6) to the grid of tube 305-R in which tube it is inverted and applied to conductor 140 to cause a shift back to oscillator 302 indicating the new phase of the follower oscillator with point 88 as a center.

The end-of-line pulses now occur restoring trigger tubes 328, 330 and 322 to their normal modes. However, the negative bias on tube 310-L prevents the downvolting line-end impulse over conductors 166 and 167 from being effective.

Scanning line 18

On scanning line 18 the signal pulse is applied to tube 327 in the manner heretofore described and results in reversal of trigger tubes 328 and 330 as well as in the application of a downvolting signal pulse to the grid of the ε space control tube 305-L (Figure 6). In the manner heretofore described this again results in the operation of trigger tube 322 showing that the ε space was not empty and also would result in the operation of the trigger tube 307 to indicate a direction to the left, were it not for the fact that this tube is already operated due to the reception of a pulse in the left δ space during the scanning of the preceding line. In other words, the direction to the left has already been registered. The operation of 322 also results over tube 318-L—305-R in the reversal of the tube 301 and the initiation of the operation of oscillator 315 which is now phased so that the pulse occurs centrally of the ε space.

Following this, the end-of-line pulses occur and trigger tubes 328, 330 and 322 are again restored to their normal mode of operation.

Scanning line 19

The operation of the circuits as a result of the scanning of line 19 and the encountering of the edge of the numeral 3 at point 92 of Figure 3 is exactly the same as that described in connection with line 18 except that the tubes 302, 303-L and 304-L are now utilized in place of tubes 315, 316 and 317, and further that subsequent to this determination that the pulse again falls in the left δ space a shift is made back to tubes 315, 316-L and 317-L which oscillate in such a phase as to place the pulse at the center of the space.

Scanning lines 20 and 21

During these two scanning lines the signal pulse falls within the $\epsilon$ space but not in either of the $\delta$ spaces. This condition is the same one which was encountered from scanning line 10 through scanning line 16 and is without effect.

Scanning line 22

On this scanning line the signal pulse occurs at a time during the oscillation of that oscillator 302 or 315 which is now in service when tube 304-L is conductive. This results in the application of a downvolting pulse over conductors 153 and 158 (Figures 5 and 6) to the left hand grid of tube 308. At the same time this downvolting pulse is applied over conductor 154 to the grid of tube 316-R and over conductor 169 to the lower grid of tube 318-L (for shifting the phase with point 90 as the new center).

Due to the application of the downvolting pulse mentioned tube 308 (Figure 6) reverses and applies a positive bias over conductor 164 to the lower grid of tube 310-L. Since the prior operation of tube 307 caused a positive bias to be applied over conductor 165 to the upper grid of tube 310-L, then the downvolting lineend impulse will cause an upvolting pulse to be applied in a manner already described in connection with feature H to the grid of tube 319-R and to the grid of tube 311-L. Due to the fact that zone counter tube 337, representing the first zone, has been restored to normal and zone counter tube 338 representing the second zone has been operated, the bias on the grid of tube 310-L will be positive and no pulse will appear on the right hand plate; while the bias on the grid of tube 311-L will be negative and a pulse will therefore appear at its plate. This downvolting pulse will be applied over conductor 202 to trigger tube 348 causing that tube to operate and resulting in operation of relay H to indicate that there has been a change of direction of the stroke being followed in the second zone.

The downvolting pulse from the plate of tube 304-L applied over conductor 154 to the grid of tube 316-R is without effect since that tube indicates when the first direction of the stroke followed is to the right and has not operated at this time because a positive bias was supplied thereto over conductor 159 from the right hand plate of now operated trigger tube 307 which trigger tube indicates a direction of the stroke to the left.

The downvolting pulse from the plate of tube 311-L is also applied over conductor 236 to the grid of tube 313-L. This grid is at this time supplied with a positive bias from the right hand plate of tube 345 (which tube reversed to indicate that zone Z-1 terminated because the stroke followed in that zone terminated) and therefore an upvolting pulse is produced in 313-L, inverted in 313-R and supplied over conductor 163 to the right hand grids of zone counter tubes 337 and 338.

Moreover, even if zone Z-1 had not terminated for this reason zone Z-2 would have terminated, the direction change being from left to right, since the downvolting pulse from tube 311-L is also applied over conductors 202 (Figures 7 and 10) and 225 (Figures 10 and 9) to the grid of tube 333-R which conducts at this time due to the bias supplied from the tube 320, which latter tube is unoperated since the initial direction in zone Z-2 was to the left (as explained when the transition from zone Z-2 to zone Z-3 was discussed. An upvolting pulse is therefore supplied to tube 303-R (Figure 5) and a downvolting pulse from that tube to zone end conductor 163.

Operated ones of the zone counting tubes 337, 338 and 340, and additionally direction detection tubes 307 and 308 are restored to normal.

Also counting tube 340 operates to indicate the start of zone Z-3.

Additionally, the restoration of tube 307 applies a positive bias to the grid of tube 316-R.

The line end impulses now occur in the manner previously described and as a result thereof the pulse counter tubes 328 and 330 are restored to their normal modes.

Scanning lines 23 through 37

On lines 23 through 31 the signal pulse continues to occur during the right $\delta$ space and tube 304-L operates to register a pulse in the right $\delta$ space, which is registered in tube 308 for the first scanning line (line 24), and not again. Of course, at each scanning line a switch is made from oscillator 302 to 315 or vice versa so that the new oscillation places the center of the $\epsilon$ space in phase with the signal pulse of the preceding scanning line.

When line 31 is reached the signal pulse no longer falls within the right $\delta$ space but instead falls within the $\epsilon$ space. Consequently, no direction is recorded but operation of trigger tube 322 occurs to indicate that a signal pulse occurs within the $\epsilon$ space, this registering, however, being wiped out at the end of each line when the end-of-line pulses occur. This operation is repeated on scanning lines 32 through 37.

Scanning line 38

As line 38 is scanned the first signal pulse results from the cathode beam striking the portion of the numeral 3 which is curved downwardly and to the right, and which portion is not the stroke being followed. As before, control tube 327 produces a negative pulse on conductor 147 which serves to reverse pulse counter tube 328 and to apply a negative pulse to the grid of the $\epsilon$ space control tube 305-L. At this time there is no positive bias on this grid from the secondary of transformer 417 because the $\epsilon$ space occurs much later than the signal pulse mentioned. Therefore, no pulse passes through the gating tubes 303-L (316-L) or 304-L (317-L).

As the scanning beam proceeds along line 38 a pulse is again produced when the right hand stroke of the figure 3, which is currently being followed, is encountered. This pulse falls in the $\epsilon$ space, and the reception of the signal pulse causes a downvolting pulse to again be applied to conductor 147 resulting in operation of pulse counter tube 331 due to the application of the pulse to the right hand grid of already operated counter tube 330. Additionally, this signal pulse is applied over conductor 147 to the grid of the $\epsilon$ space control tube 305-L at a time when the phase of the sine wave voltage from the secondary of transformer 417 is such as to permit an upvolting pulse to be produced on the left plate of this tube.

This upvolting pulse is applied to the lower grids of tubes 303-L (316-L) and 304-L (317-L) but without effect since these gating tubes are not conductive due to the bias on their upper grids. However, this pulse is also applied over conductor 187 to the grid of tube 321-R and over conductors 187 and 235 to the lower grid of tube 312-L. The application of this upvolting pulse to the grid of tube 321 causes a downvolting pulse to be applied over conductor 186 to trigger tube 322 which then reverses indicating that there was a pulse in the $\epsilon$ space.

However, shortly thereafter, the line end impulses occur and the tube 322 is restored to normal as are the counter tubes 330 and 331.

Scanning line 39

As line 39 is scanned the first signal pulse again results from the cathode beam striking a portion of the numeral 3 which is curved downwardly and to the right and which portion is not the stroke being followed. The operations performed as a result of this are the same as those performed in line 39 when the first pulse was produced.

As the scanning beam proceeds along line 39 a pulse is again produced when the right hand stroke of the figure 3, which is being followed, is encountered. This pulse, indicated at 95 in Figure 3, falls in the left δ space. As a result tube 303–L supplies a downvolting pulse to trigger tube 307 which tube then reverses supplying an upvolting pulse to its left hand plate over conductor 210 to the grid of tube 311–R. This grid is now supplied with a negative bias from the right hand plate of operated zone counter tube 340 over conductor 211 (Figures 10 and 7). Consequently, a downvolting pulse is applied from the plate of tube 311–R over conductor 212 to the left hand grid of trigger tube 352 which operates indicating that the stroke being followed has a region in which it inclines to the left in zone Z–3.

Scanning lines 40 through 44

On these scanning lines the pulse caused by the cathode beam encountering a left hand stroke of the numeral 3 are ineffective because this stroke is not then being followed. Moreover, the pulses produced by the cathode beam encountering the right hand stroke are effective only to operate the direction registering and indicating tubes 303–L and 307 but without effect since 307 was operated to its alternate mode during the scanning of line 39 as described above. Moreover, since there was no break in the outline of the numeral 3 at any time, tube 353 has not been reversed during this scanning and therefore this tube remains in its normal mode and the relay L remains unoperated indicating that there was no such break.

Finally, a scanning of the entire area in which the numeral might have been written is completed and in the manner indicated in the opening parts of this description the ground connection to various of the tube cathodes is broken and all of the tubes are restored to their normal situation awaiting the scanning of a subsequent frame.

During the scanning of the numeral 3 of the form shown in Figure 3 relays E, F, H and K operated and the remaining relays remained unoperated. Referring now to Figure 14, it will be seen that when the four relays mentioned have operated a circuit is completed through the armature and left hand contact of unoperated relay A, armature and unoperated contact of relay D, thence through the armature and operated contact of relay E, the armature and operated contact of relay F, the armature and operated contact of relay H, the armature and unoperated contact of relay I, the armature and unoperated contact of relay J, the armature and operated contact of relay K, and the armature and unoperated contact of relay L to the final indicating or registering device such as a relay, solenoid, or other electro-magnetic device which final device is designated by the numeral "3." Thus, it is clear that the operation of the circuits described in detail above properly identifies the form of numeral shown in Figure 3.

The above description is exemplary only of the operation of the circuits. It is believed that the operation in connection with other numerals and forms thereof will be obvious from the preceding description.

It will also be clear that although specific circuits and circuit components have been mentioned, modifications of the circuits and of the components utilized therein may readily be made. I therefore wish to be limited not by the foregoing description, but on the contrary, solely by the claims granted to me.

What is claimed is:

1. Apparatus for identifying an Arabic numeral which has been written by hand, comprising, in combination, scanning means operable to scan an area including said numeral, line by line, to produce pulses when said scanning means encounters the outline of said numeral, means to separate long pulses produced by substantially horizontal portions of said numeral outline from short pulses produced by portions of said outline at an angle to the horizontal, means to count said short pulses, means to register certain of said counted combinations, means to establish the phase of the first short pulse in a scanning frame with respect to the beginning of the scanning line, means to determine the phase of corresponding succeeding short pulses with respect to said established phase to thereby determine the direction of inclination of a portion of said outline being followed, means to divide the outline of a symbol being followed into zones dependent upon the termination of the portion of the outline being followed and upon a change in direction of a portion of the outline being followed, means for registering said determined direction, means for registering changes in direction, means for registering the number of zones, means for registering the number of pulses per scanning line and recording means operable selectively by operated ones of said registering means for identifying a scanned symbol.

2. Apparatus for identifying an Arabic numeral which has been written by hand, comprising, in combination, an iconoscope, means projecting an image of the numeral to be identified on said iconoscope, means causing the cathode beam of said iconoscope to scan an area including a numeral line-by-line forming a raster, said iconoscope being operative to produce pulses when said scanning beam encounters the image of said numeral, means to separate long pulses resulting from the scanning of a substantially horizontal portion of the outline of the numeral from short pulses produced when said beam scans portions of the numeral at an angle to the horizontal, means to count the short pulses produced on any scanning line, means restoring said counting means to normal at the end of each scanning line, means to register the number of pulses counted prior to said restoration, means to establish the phase of the first short pulses produced in any raster with respect to the beginning of the scanning line along which it occurred, means to determine the phase of corresponding successive short pulses with respect to said established pulses to thereby determine the direction of inclination of a portion of said outline represented by the series of short pulses in successive scanning lines, means to divide the symbol being identified into zones dependent upon the termination of that portion of an outline being followed, said portion being terminated when a corresponding short pulse no longer appears on a scanning line or when the direction of the portion being followed changes, a counting device operable to count the number of zones, means under control of said zone counting device to register the number of zones into which the numeral was divided, means operable at the completion of each raster for restoring said zone counting device to normal, and recording means operable in accordance with the combination of said registering means operated to identify and record the numeral scanned.

3. A device for identifying written symbol portions, comprising, in combination, an electrical transducer for translating each symbol portion into a series of electrical impulses, wave generating means, means operable by certain of said impulses to energize said wave generating means to produce a first wave in phase with one of said certain impulses and other waves 90° out of phase of said signal impulses on opposite sides of said first wave, means to limit said generated waves to crest portions only, said limiting means providing overlapping crest portions of said first waves and said other waves, and means for indicating when a succeeding signal impulse is received from said transducer during one of said overlapped wave portions.

4. A device in accordance with claim 3 in which said electrical transducer is an iconoscope having horizontal and vertical deflection circuits for scanning the several symbol portions line by line.

5. A device in accordance with claim 3, in which said wave generating means comprises an oscillator, said oscillator directly generating said other waves and said first wave being generated from one of said other waves by means of a phase modifying apparatus.

6. A device in accordance with claim 3, in which said wave generating means comprises an oscillator directly generating said other waves, said other waves being displaced 180° from each other, a transformer which generates said first wave from said other two waves, said wave being intermediate said other two waves and 90° displaced in phase and in which said indicating means comprises gating electron tubes operable to pass a signal pulse only when said pulse coincides in time with overlapped crest portions of said first wave and one of said other waves.

7. A device as claimed in claim 3, characterized in that a pair of wave generating means is provided, one of said pair of wave generating means being operable by a first signal impulse to produce said first wave and said other waves, the second of said wave generating means being energized upon receipt of a signal impulse coinciding in time with one of said overlapped wave crest portions, said second wave generating means then producing a similar first wave and similar other waves and means operable upon receipt of a signal impulse coinciding with the overlapped crest portions of said second wave series to de-energize said second wave generating means and re-energize said first wave generating means.

8. A device in accordance with claim 3, wherein said indicating means includes means for indicating when a signal impulse occurs during a crest of said first generated wave in a portion thereof which does not overlap crest portions of said other generated waves.

9. A device in accordance with claim 3 wherein means are provided to indicate when a signal voltage occurs during said crest portion of said first wave without a signal impulse occurring therein, said indication showing that a portion of the symbol extends horizontally and intersects the portion being followed.

10. A device in accordance with claim 3, wherein said indicating means indicates the absence of both a signal pulse and a voltage during the period of said crest of said first wave which does not overlap said crest of either of said other waves to thereby indicate that the portion of the symbol being followed has terminated.

11. A device in accordance with claim 3, wherein additional means are provided for indicating when a signal pulse coinciding with the overlapped crest portions of said first waves and one of said other waves has been followed by a signal pulse coinciding with the overlapped crest portions of said first wave and the other one of said other waves to thereby indicate that the portion of the symbol being followed has changed the direction of its slope.

12. A device for identifying handwritten symbols, comprising, in combination, an electrical transducer for translating the symbol into a series of electrical impulses, wave generating means, means operable by certain of said impulses to energize said wave generating means to produce a first wave in phase with said certain signal impulse, and other waves respectively 90° out of phase with said first wave and displaced in opposite directions therefrom, means to limit said generated waves to crest portions only, said limiting means producing overlapping portions of said first wave and said other waves respectively, means for indicating when a succeeding signal impulse received from said transducer coincides in time with one of said overlapped crest portions, means for counting the impulses on each scanning line to thereby divide the symbol into portions, means to indicate when no signal pulse coincides with the crest portion of said first wave, means to indicate when a signal pulse coincides with the overlapped crest portion of said first wave and one of said other waves, means to indicate when a succeeding pulse coincides in time with the overlapped portion of said first wave and the other one of said other waves, means to indicate a change in the number of signal impulses received per scanning line, and means operable by any one of said last three indicating means to cause a new portion of the symbol to be effective in further operation of said wave generating and indicating means.

13. The device of claim 12, wherein means are provided for restoring said pulse counting means to normal condition at the end of each scanning line.

14. The device of claim 12 wherein said means operable by said three indicating means comprises counting means, said counting means being operable to indicate the termination of a portion of a symbol being followed and the start of the following of a new portion, and means for restoring said counting means to normal upon the termination of the scanning of a complete symbol.

15. A device for identifying handwritten symbols comprising, in combination, means for scanning the area in which a symbol may reside, means for following a particular line of said scanned symbol through said symbol notwithstanding the presence of other lines on either side of the particular line, means responsive to signals from said following means and said scanning means for identifying said symbol, and means for shifting said following means to a second line of said symbol upon the discontinuance of the line first being followed.

16. Apparatus for electromechanically identifying written symbols comprising means for scanning a symbol, means for producing pulses on each scanning line in accordance with the characteristics of said symbol, means for registering the number and duration of said pulses on each said line, means for detecting the phase difference of certain pulses on one scanning line with respect to similar pulses on following scanning lines, means for registering features of said symbols, means for operating the last said means in accordance with the number, duration and phase difference of said pulses, further registering means, and means for operating the last said registering means in accordance with the combination of feature registering means which have been operated.

17. Apparatus for identifying written symbols comprising electrical transducing apparatus for scanning each symbol to translate said symbol into a series of electrical impulses, means for selectively utilizing certain of said impulses to time electrical waves, means for utilizing said waves to time succeeding impulses and means to determine the timing of said succeeding impulses relative to said certain impulses whereby the direction of pulses of the symbol being scanned are determined.

18. Apparatus for identifying portions of written symbols comprising means for scanning each symbol to produce a series of electrical impulses, means for energizing a wave generator upon the receipt of a particular signal pulse produced during the scanning of a symbol portion to produce an electrical wave having a predetermined phase relationship to said particular pulse, means for producing waves of the same frequency but phase-displaced on opposite sides of said first phase, means for biasing said wave producing means to produce wave-crests, said wave-crest of said last two waves overlapping the crest of said first wave at opposite ends thereof, means for detecting the coincidence of a pulse on a succeeding line of said symbol portion with an overlapped crest portion of said wave-crest, and means for indicating during which of said overlapped crest portions said signal pulse occurs, whereby the direction of slope of the symbol pulse is indicated.

19. Apparatus as claimed in claim 8 wherein the frequency of said generated wave is equal to the horizontal scanning frequency of said scanning means.

20. Apparatus as claimed in claim 19 further including means for re-establishing said waves when a signal coincides with one of said overlapped wave-crest portions, said electrical waves being re-established with said first wave in phase with said coinciding signal pulse.

21. Apparatus as claimed in claim 19 further including means for indicating the existence of a signal pulse which falls within the portion of said first generated wave-crest which is not overlapped by said other generated wave-crests.

22. Apparatus as claimed in claim 20 further including means for indicating which overlapped wave-crest portion coincides with said signal.

23. Apparatus as claimed in claim 22 further including means for detecting when signal pulses have coincided with both said overlapping wave-crest portions which indicating means is responsive to the last said means thereby indicating a change in direction of the slope of a portion of a symbol.

References Cited in the file of this patent

UNITED STATES PATENTS

| | | |
|---|---|---|
| 2,261,542 | Dickinson et al. | Nov. 4, 1941 |
| 2,610,542 | Smith | Sept. 16, 1952 |
| 2,615,992 | Flory | Oct. 28, 1952 |
| 2,616,983 | Zworykin | Nov. 4, 1952 |
| 2,738,499 | Sprick | Mar. 13, 1956 |
| 2,784,251 | Young | Mar. 5, 1957 |

UNITED STATES PATENT OFFICE
CERTIFICATE OF CORRECTION

March 8, 1960

Patent No. 2,928,074

Hans Sutter

It is hereby certified that error appears in the printed specification of the above numbered patent requiring correction and that the said Letters Patent should read as corrected below.

Column 15, line 55, for "is" read -- it --; column 36, line 48, for "pulses" read -- portions --; line 68, for the claim reference numeral "8" read -- 18 --.

Signed and sealed this 8th day of November 1960.

(SEAL)
Attest:
KARL H. AXLINE
Attesting Officer

ROBERT C. WATSON
Commissioner of Patents